US010013672B2

(12) United States Patent
Seeger, III et al.

(10) Patent No.: US 10,013,672 B2
(45) Date of Patent: Jul. 3, 2018

(54) ADDRESS EXTRACTION FROM A COMMUNICATION

(71) Applicant: OATH INC., New York, NY (US)

(72) Inventors: Richard Earle Seeger, III, Pacifica, CA (US); Peter Monaco, Los Altos, CA (US)

(73) Assignee: OATH INC., New York, NY (US)

( * ) Notice: Subject to any disclaimer, the term of this patent is extended or adjusted under 35 U.S.C. 154(b) by 15 days.

(21) Appl. No.: 13/667,205

(22) Filed: Nov. 2, 2012

(65) Prior Publication Data

US 2014/0129569 A1 May 8, 2014

(51) Int. Cl.
*G06F 17/30* (2006.01)
*G06Q 10/10* (2012.01)

(52) U.S. Cl.
CPC ..... *G06Q 10/101* (2013.01); *G06F 17/30867* (2013.01)

(58) Field of Classification Search
CPC ......... G06F 17/30864; G06F 17/30422; G06F 2212/171; G06F 17/30011;
(Continued)

(56) References Cited

U.S. PATENT DOCUMENTS 5,396,647 A 3/1995 Thompson et al.
5,610,915 A 3/1997 Elliott et al.
(Continued)

FOREIGN PATENT DOCUMENTS

EP 0944002 9/1999
JP 2003006116 1/2003
(Continued)

OTHER PUBLICATIONS

Android-Tips.com, "Android Tips & Tricks: How to Import Contacts into Android Phone," located at http://android-tips.com/how-to-import-contacts-into-android/, Nov. 17, 2008 (document provided includes third-party comments submitted under the USPTO PeerToPatent program).
(Continued)

*Primary Examiner* — Mariela Reyes
*Assistant Examiner* — Courtney Harmon
(74) *Attorney, Agent, or Firm* — James J. DeCarlo; Greenberg Traurig, LLP

(57) ABSTRACT

Systems and methods to extract a string from a communication. A method includes: receiving a communication comprising a plurality of strings; assigning a score to each of the strings, wherein the score assigned to each of the strings corresponds to a frequency of usage of the respective string for a first function relative to an overall frequency of usage of the respective string; determining a respective total sum for each of a plurality of sequences in the communication, the respective total sum determined as a sum of the scores for each string in the respective sequence; and extracting a first sequence of the sequences from the communication based on the total sum for the first sequence. In one embodiment, the total sum includes an additional score for each of a starting word and an ending word of the first word sequence, wherein each respective additional score is associated with a probability that the starting (or ending) word is used as the first (or last word) of an address.

13 Claims, 21 Drawing Sheets

(58) Field of Classification Search
CPC ........... G06F 17/30672; G06F 12/0684; G06F 17/3087; G06F 17/30303; G06Q 30/02
See application file for complete search history.

(56) References Cited

U.S. PATENT DOCUMENTS

| | | | |
|---|---|---|---|
| 5,966,714 | A | 10/1999 | Huang et al. |
| 6,020,884 | A | 2/2000 | MacNaughton et al. |
| 6,285,999 | B1 | 9/2001 | Page |
| 6,385,644 | B1 | 5/2002 | Devine et al. |
| 6,484,196 | B1 | 11/2002 | Maurille |
| 6,510,453 | B1 | 1/2003 | Apfel et al. |
| 6,560,620 | B1 | 5/2003 | Ching |
| 6,594,654 | B1 | 7/2003 | Salam et al. |
| 6,721,748 | B1 | 4/2004 | Knight et al. |
| 6,816,850 | B2 | 11/2004 | Culliss |
| 6,832,245 | B1 | 12/2004 | Isaacs et al. |
| 6,931,419 | B1 | 8/2005 | Lindquist |
| 6,952,805 | B1 | 10/2005 | Tafoya et al. |
| 6,996,777 | B2 | 2/2006 | Hiipakka |
| 7,003,724 | B2 | 2/2006 | Newman |
| 7,058,892 | B1 | 6/2006 | MacNaughton et al. |
| 7,076,533 | B1 | 7/2006 | Knox et al. |
| 7,085,745 | B2 | 8/2006 | Klug |
| 7,103,806 | B1 | 9/2006 | Horvitz |
| 7,181,518 | B1 | 2/2007 | Matsumoto et al. |
| 7,185,065 | B1 | 2/2007 | Holtzman et al. |
| 7,246,045 | B1 | 7/2007 | Rappaport et al. |
| 7,328,242 | B1 | 2/2008 | McCarthy et al. |
| 7,333,976 | B1 | 2/2008 | Auerbach et al. |
| 7,359,894 | B1 | 4/2008 | Liebman et al. |
| 7,383,307 | B2 | 6/2008 | Kirkland et al. |
| 7,444,323 | B2 | 10/2008 | Martinez et al. |
| 7,475,109 | B1 | 1/2009 | Fletcher et al. |
| 7,475,113 | B2 | 1/2009 | Stolze |
| 7,512,788 | B2 | 3/2009 | Choi et al. |
| 7,512,814 | B2 | 3/2009 | Chen et al. |
| 7,536,384 | B2 | 5/2009 | Venkataraman et al. |
| 7,539,676 | B2 | 5/2009 | Aravamudan |
| 7,580,363 | B2 | 8/2009 | Sorvari et al. |
| 7,593,995 | B1 | 9/2009 | He et al. |
| 7,620,407 | B1 | 11/2009 | Donald et al. |
| 7,624,103 | B2 | 11/2009 | Wiegering et al. |
| 7,627,598 | B1 | 12/2009 | Burke |
| 7,634,463 | B1 | 12/2009 | Katragadda et al. |
| 7,639,157 | B1 | 12/2009 | Whitley et al. |
| 7,653,695 | B2 | 1/2010 | Flury et al. |
| 7,692,653 | B1 | 4/2010 | Petro et al. |
| 7,702,730 | B2 | 4/2010 | Spataro et al. |
| 7,707,249 | B2 | 4/2010 | Spataro et al. |
| 7,707,509 | B2 | 4/2010 | Naono et al. |
| 7,716,140 | B1 | 5/2010 | Nielsen et al. |
| 7,720,916 | B2 | 5/2010 | Fisher et al. |
| 7,725,492 | B2 | 5/2010 | Sittig |
| 7,743,051 | B1 | 6/2010 | Kashyap et al. |
| 7,752,081 | B2 | 7/2010 | Calabria |
| 7,756,895 | B1 | 7/2010 | Emigh |
| 7,756,935 | B2 | 7/2010 | Gaucas |
| 7,761,436 | B2 | 7/2010 | Norton et al. |
| 7,788,260 | B2 | 8/2010 | Lunt |
| 7,805,492 | B1 | 9/2010 | Thatcher et al. |
| 7,818,396 | B2 | 10/2010 | Dolin et al. |
| 7,827,208 | B2 | 11/2010 | Bosworth |
| 7,827,265 | B2 | 11/2010 | Cheever et al. |
| 7,831,692 | B2 | 11/2010 | French et al. |
| 7,836,045 | B2 | 11/2010 | Schachter |
| 7,836,134 | B2 | 11/2010 | Pantalone |
| 7,849,141 | B1 | 12/2010 | Bellegarda et al. |
| 7,849,142 | B2 | 12/2010 | Clegg et al. |
| 7,853,602 | B2 | 12/2010 | Gorti et al. |
| 7,853,881 | B1 | 12/2010 | Aly Assal et al. |
| 7,870,197 | B2 | 1/2011 | Lewis et al. |
| 7,899,806 | B2 | 3/2011 | Aravamudan |
| 7,899,871 | B1 | 3/2011 | Kumar et al. |
| 7,908,647 | B1 | 3/2011 | Polis et al. |
| 7,949,627 | B2 | 5/2011 | Aravamudan |
| 7,970,832 | B2 | 6/2011 | Perry et al. |
| 7,979,569 | B2 | 7/2011 | Eisner et al. |
| 7,991,764 | B2 | 8/2011 | Rathod |
| 7,996,456 | B2 | 8/2011 | Gross |
| 8,005,806 | B2 | 8/2011 | Rupp et al. |
| 8,032,598 | B1 | 10/2011 | He et al. |
| 8,055,715 | B2 | 11/2011 | Bensky et al. |
| 8,073,928 | B2 | 12/2011 | Dolin et al. |
| 8,086,676 | B2 | 12/2011 | Palahnuk et al. |
| 8,112,437 | B1 | 2/2012 | Katragadda et al. |
| 8,140,566 | B2 | 3/2012 | Boerries et al. |
| 8,161,122 | B2 | 4/2012 | Sood et al. |
| 8,200,808 | B2 | 6/2012 | Ishida |
| 8,204,897 | B1 | 6/2012 | Djabarov et al. |
| 8,284,783 | B1 | 10/2012 | Maufer et al. |
| 8,291,019 | B1 | 10/2012 | Rochelle et al. |
| 8,296,179 | B1 | 10/2012 | Rennison |
| 8,316,315 | B2 | 11/2012 | Portnoy et al. |
| 8,392,409 | B1 | 3/2013 | Kashyap et al. |
| 8,392,836 | B1 | 3/2013 | Bau et al. |
| 8,423,545 | B2 | 4/2013 | Cort et al. |
| 8,443,441 | B2 | 5/2013 | Stolfo et al. |
| 8,452,745 | B2 | 5/2013 | Ramakrishna |
| 8,463,872 | B2 | 6/2013 | Pounds et al. |
| 8,468,168 | B2 | 6/2013 | Brezina et al. |
| 8,495,045 | B2 | 7/2013 | Wolf et al. |
| 8,510,389 | B1 | 8/2013 | Gurajada et al. |
| 8,522,257 | B2 | 8/2013 | Rupp et al. |
| 8,549,412 | B2 | 10/2013 | Brezina et al. |
| 8,566,306 | B2 | 10/2013 | Jones |
| 8,600,343 | B2 | 12/2013 | Brezina et al. |
| 8,620,935 | B2 | 12/2013 | Rubin et al. |
| 8,661,002 | B2 | 2/2014 | Smith et al. |
| 8,745,060 | B2 | 6/2014 | Brezina et al. |
| 8,793,625 | B2 | 7/2014 | Rhee et al. |
| 8,818,995 | B1 | 8/2014 | Guha |
| 9,009,065 | B2 | 4/2015 | Reis et al. |
| 9,020,938 | B2 | 4/2015 | Cort et al. |
| 9,058,366 | B2 | 6/2015 | Brezina et al. |
| 9,069,825 | B1 | 6/2015 | Chang |
| 9,195,969 | B2 | 11/2015 | Bau et al. |
| 9,235,848 | B1 | 1/2016 | Gourley et al. |
| 9,275,118 | B2 | 3/2016 | Brezina et al. |
| 9,298,783 | B2 | 3/2016 | Brezina et al. |
| 9,591,086 | B2 | 3/2017 | Brezina et al. |
| 9,596,308 | B2 | 3/2017 | Brezina et al. |
| 9,699,258 | B2 | 7/2017 | Brezina et al. |
| 9,716,764 | B2 | 7/2017 | Brezina et al. |
| 9,842,144 | B2 | 12/2017 | Cort et al. |
| 9,842,145 | B2 | 12/2017 | Cort et al. |
| 2001/0037407 | A1 | 11/2001 | Dragulev et al. |
| 2001/0049628 | A1 | 12/2001 | Icho |
| 2002/0016818 | A1 | 2/2002 | Kirani et al. |
| 2002/0024536 | A1 | 2/2002 | Kahan et al. |
| 2002/0049751 | A1 | 4/2002 | Chen et al. |
| 2002/0054587 | A1 | 5/2002 | Baker et al. |
| 2002/0059402 | A1 | 5/2002 | Belanger |
| 2002/0059418 | A1 | 5/2002 | Bird et al. |
| 2002/0059425 | A1 | 5/2002 | Belfiore et al. |
| 2002/0073011 | A1 | 6/2002 | Brattain et al. |
| 2002/0073058 | A1 | 6/2002 | Kremer et al. |
| 2002/0076004 | A1 | 6/2002 | Brockenbrough et al. |
| 2002/0087647 | A1 | 7/2002 | Quine et al. |
| 2002/0091777 | A1 | 7/2002 | Schwartz |
| 2002/0103873 | A1 | 8/2002 | Ramanathan et al. |
| 2002/0103879 | A1 | 8/2002 | Mondragon |
| 2002/0107991 | A1 | 8/2002 | Maguire et al. |
| 2002/0116396 | A1 | 8/2002 | Somers et al. |
| 2002/0143871 | A1 | 10/2002 | Meyer et al. |
| 2002/0152216 | A1 | 10/2002 | Bouthors |
| 2002/0194502 | A1 | 12/2002 | Sheth et al. |
| 2003/0028525 | A1 | 2/2003 | Santos et al. |
| 2003/0037116 | A1 | 2/2003 | Nolan et al. |
| 2003/0114956 | A1 | 6/2003 | Cullen et al. |
| 2003/0120608 | A1 | 6/2003 | Pereyra |
| 2003/0142125 | A1 | 7/2003 | Salmimaa et al. |
| 2003/0167324 | A1 | 9/2003 | Farnham et al. |
| 2003/0195937 | A1 | 10/2003 | Kircher, Jr. et al. |

(56) References Cited

U.S. PATENT DOCUMENTS

2003/0204439 A1 10/2003 Cullen
2003/0220978 A1 11/2003 Rhodes
2003/0220989 A1 11/2003 Tsuji et al.
2003/0233419 A1 12/2003 Beringer
2004/0002903 A1 1/2004 Stolfo et al.
2004/0015554 A1 1/2004 Wilson
2004/0034537 A1 2/2004 Gengarella et al.
2004/0039630 A1 2/2004 Begole et al.
2004/0056901 A1 3/2004 March et al.
2004/0068545 A1 4/2004 Daniell et al.
2004/0073616 A1 4/2004 Fellenstein et al.
2004/0078443 A1 4/2004 Malik
2004/0078444 A1 4/2004 Malik
2004/0078445 A1 4/2004 Malik
2004/0100497 A1 5/2004 Quillen et al.
2004/0128355 A1 7/2004 Chao et al.
2004/0128356 A1 7/2004 Bernstein et al.
2004/0133465 A1* 7/2004 Koge et al. .................... 705/14
2004/0153504 A1 8/2004 Hutchinson et al.
2004/0162878 A1 8/2004 Lewis et al.
2004/0174964 A1 9/2004 Koch
2004/0177048 A1 9/2004 Klug
2004/0186851 A1 9/2004 Jhingan et al.
2004/0202117 A1 10/2004 Wilson et al.
2004/0205002 A1 10/2004 Layton
2004/0215726 A1 10/2004 Arning et al.
2004/0260756 A1 12/2004 Forstall et al.
2004/0268229 A1 12/2004 Paoli et al.
2005/0027779 A1 2/2005 Schinner
2005/0038687 A1 2/2005 Galdes
2005/0055639 A1 3/2005 Fogg
2005/0060638 A1 3/2005 Mathew et al.
2005/0076090 A1 4/2005 Thuerk
2005/0080868 A1 4/2005 Malik
2005/0091203 A1* 4/2005 Liu .................. G06F 17/30719
2005/0091272 A1 4/2005 Smith et al.
2005/0091314 A1 4/2005 Blagsvedt et al.
2005/0091319 A1 4/2005 Kirsch
2005/0102361 A1 5/2005 Winjum et al.
2005/0108273 A1 5/2005 Brebner
2005/0131888 A1 6/2005 Tafoya et al.
2005/0138070 A1 6/2005 Huberman et al.
2005/0138631 A1 6/2005 Bellotti et al.
2005/0149620 A1 7/2005 Kirkland et al.
2005/0159970 A1 7/2005 Buyukkokten et al.
2005/0164704 A1 7/2005 Winsor
2005/0165584 A1 7/2005 Boody et al.
2005/0165893 A1 7/2005 Feinberg et al.
2005/0188028 A1 8/2005 Brown, Jr. et al.
2005/0198159 A1 9/2005 Kirsch
2005/0198299 A1 9/2005 Beck et al.
2005/0198305 A1 9/2005 Pezaris et al.
2005/0204009 A1 9/2005 Hazarika et al.
2005/0213511 A1 9/2005 Reece et al.
2005/0216300 A1 9/2005 Appelman et al.
2005/0222890 A1 10/2005 Cheng et al.
2005/0228881 A1 10/2005 Reasor et al.
2005/0228899 A1 10/2005 Wendkos et al.
2005/0235224 A1 10/2005 Arend et al.
2005/0278317 A1 12/2005 Gross et al.
2006/0004713 A1 1/2006 Korte et al.
2006/0004892 A1 1/2006 Lunt
2006/0004914 A1 1/2006 Kelly et al.
2006/0015533 A1 1/2006 Wolf et al.
2006/0015561 A1* 1/2006 Murphy et al. ............... 709/206
2006/0020398 A1 1/2006 Vernon et al.
2006/0031340 A1 2/2006 Mathew et al.
2006/0031775 A1 2/2006 Sattler et al.
2006/0047747 A1 3/2006 Erickson et al.
2006/0053199 A1 3/2006 Pricken et al.
2006/0056015 A1 3/2006 Nishiyama
2006/0059151 A1 3/2006 Martinez et al.
2006/0059238 A1 3/2006 Slater et al.
2006/0064434 A1 3/2006 Gilbert et al.
2006/0065733 A1 3/2006 Lee et al.
2006/0075046 A1 4/2006 Yozell-Epstein et al.
2006/0083357 A1 4/2006 Howell et al.
2006/0083358 A1 4/2006 Fong et al.
2006/0085752 A1 4/2006 Beadle et al.
2006/0095502 A1 5/2006 Lewis et al.
2006/0101285 A1 5/2006 Chen et al.
2006/0101350 A1 5/2006 Scott
2006/0123357 A1 6/2006 Okamura
2006/0136494 A1 6/2006 Oh
2006/0168073 A1 7/2006 Kogan et al.
2006/0173824 A1 8/2006 Bensky et al.
2006/0173961 A1 8/2006 Turski et al.
2006/0179415 A1 8/2006 Cadiz et al.
2006/0195361 A1 8/2006 Rosenberg
2006/0195474 A1 8/2006 Cadiz et al.
2006/0195785 A1 8/2006 Portnoy et al.
2006/0217116 A1 9/2006 Cassell et al.
2006/0224675 A1 10/2006 Fox et al.
2006/0242536 A1 10/2006 Gogerty
2006/0242609 A1 10/2006 Potter et al.
2006/0248151 A1 11/2006 Belakovskiy et al.
2006/0256008 A1 11/2006 Rosenberg
2006/0271630 A1 11/2006 Bensky et al.
2006/0281447 A1 12/2006 Lewis et al.
2006/0282303 A1 12/2006 Hale et al.
2007/0005702 A1 1/2007 Tokuda et al.
2007/0005715 A1 1/2007 LeVasseur et al.
2007/0005750 A1 1/2007 Lunt et al.
2007/0011367 A1 1/2007 Scott et al.
2007/0016647 A1 1/2007 Gupta et al.
2007/0022447 A1 1/2007 Arseneau et al.
2007/0060328 A1 3/2007 Zeike et al.
2007/0061300 A1* 3/2007 Ramer et al. ..................... 707/3
2007/0067289 A1* 3/2007 Novak ................ G06F 17/2775
2007/0071187 A1 3/2007 Apreutesei et al.
2007/0083651 A1 4/2007 Ishida
2007/0088687 A1 4/2007 Bromm et al.
2007/0106780 A1 5/2007 Farnham et al.
2007/0112761 A1 5/2007 Xu et al.
2007/0115991 A1 5/2007 Ramani et al.
2007/0118533 A1 5/2007 Ramer et al.
2007/0123222 A1 5/2007 Cox et al.
2007/0124432 A1 5/2007 Holtzman et al.
2007/0129977 A1 6/2007 Forney
2007/0130527 A1 6/2007 Kim
2007/0135110 A1 6/2007 Athale et al.
2007/0143414 A1 6/2007 Daigle
2007/0156732 A1 7/2007 Surendran et al.
2007/0174432 A1 7/2007 Rhee et al.
2007/0177717 A1 8/2007 Owens et al.
2007/0185844 A1 8/2007 Schachter
2007/0185865 A1* 8/2007 Budzik et al. .................... 707/5
2007/0192490 A1 8/2007 Minhas
2007/0203991 A1 8/2007 Fisher et al.
2007/0208802 A1 9/2007 Barman et al.
2007/0214141 A1 9/2007 Sittig
2007/0218900 A1 9/2007 Abhyanker
2007/0244881 A1 10/2007 Cha et al.
2007/0255794 A1 11/2007 Coutts
2007/0271527 A1 11/2007 Paas et al.
2007/0273517 A1 11/2007 Govind
2007/0282956 A1 12/2007 Staats
2007/0288514 A1* 12/2007 Reitter et al. ............. 707/104.1
2007/0288578 A1 12/2007 Pantalone
2007/0294281 A1 12/2007 Ward et al.
2007/0294428 A1 12/2007 Guy et al.
2008/0005247 A9 1/2008 Khoo
2008/0005249 A1 1/2008 Hart
2008/0031241 A1 2/2008 Toebes et al.
2008/0037721 A1 2/2008 Yao et al.
2008/0040370 A1 2/2008 Bosworth
2008/0040474 A1 2/2008 Zuckerberg
2008/0040475 A1 2/2008 Bosworth
2008/0055263 A1 3/2008 Lemay et al.
2008/0056269 A1 3/2008 Madhani et al.
2008/0065701 A1 3/2008 Lindstrom et al.
2008/0071872 A1 3/2008 Gross
2008/0077614 A1 3/2008 Roy
2008/0104052 A1 5/2008 Ryan et al.

(56) References Cited

U.S. PATENT DOCUMENTS

2008/0113674 A1 5/2008 Baig
2008/0114758 A1 5/2008 Rupp et al.
2008/0119201 A1 5/2008 Kolber et al.
2008/0120411 A1 5/2008 Eberle
2008/0122796 A1 5/2008 Jobs et al.
2008/0133540 A1* 6/2008 Hubbard et al. ................ 707/10
2008/0147639 A1 6/2008 Hartman et al.
2008/0147810 A1 6/2008 Kumar et al.
2008/0162347 A1 7/2008 Wagner
2008/0162649 A1 7/2008 Lee et al.
2008/0162651 A1 7/2008 Madnani
2008/0163164 A1 7/2008 Chowdhary et al.
2008/0170158 A1 7/2008 Jung et al.
2008/0172362 A1 7/2008 Shacham et al.
2008/0172464 A1 7/2008 Thattai et al.
2008/0183832 A1 7/2008 Kirkland et al.
2008/0216092 A1 9/2008 Serlet
2008/0220752 A1 9/2008 Forstall et al.
2008/0222279 A1 9/2008 Cioffi et al.
2008/0222546 A1 9/2008 Mudd et al.
2008/0235353 A1 9/2008 Cheever et al.
2008/0242277 A1 10/2008 Chen et al.
2008/0268882 A1 10/2008 Moloney
2008/0270939 A1 10/2008 Mueller
2008/0275748 A1 11/2008 John
2008/0290987 A1 11/2008 Li
2008/0293403 A1 11/2008 Quon et al.
2008/0301166 A1 12/2008 Sugiyama et al.
2008/0301175 A1 12/2008 Applebaum et al.
2008/0301245 A1 12/2008 Estrada et al.
2008/0307066 A1 12/2008 Amidon et al.
2009/0005076 A1 1/2009 Forstall et al.
2009/0010353 A1 1/2009 She et al.
2009/0029674 A1 1/2009 Brezina et al.
2009/0030872 A1 1/2009 Brezina et al.
2009/0030919 A1 1/2009 Brezina et al.
2009/0030933 A1 1/2009 Brezina et al.
2009/0030940 A1 1/2009 Brezina et al.
2009/0031232 A1 1/2009 Brezina et al.
2009/0031244 A1 1/2009 Brezina et al.
2009/0031245 A1 1/2009 Brezina et al.
2009/0037541 A1 2/2009 Wilson
2009/0048994 A1 2/2009 Applebaum et al.
2009/0054091 A1 2/2009 van Wijk et al.
2009/0063130 A1* 3/2009 Moore ................ G06F 17/2818
704/4
2009/0070412 A1 3/2009 D'Angelo
2009/0077026 A1 3/2009 Yanagihara
2009/0106415 A1 4/2009 Brezina et al.
2009/0106676 A1 4/2009 Brezina et al.
2009/0106695 A1 4/2009 Perry et al.
2009/0111495 A1 4/2009 Sjolin et al.
2009/0119678 A1 5/2009 Shih et al.
2009/0150251 A1 6/2009 Zhitomirsky
2009/0156170 A1 6/2009 Rossano et al.
2009/0157717 A1 6/2009 Palahnuk et al.
2009/0171930 A1 7/2009 Vaughan et al.
2009/0174680 A1 7/2009 Anzures et al.
2009/0177754 A1 7/2009 Brezina et al.
2009/0182788 A1 7/2009 Chung et al.
2009/0191899 A1 7/2009 Wilson et al.
2009/0198688 A1 8/2009 Venkataraman et al.
2009/0213088 A1 8/2009 Hardy et al.
2009/0228555 A1 9/2009 Joviak et al.
2009/0234815 A1 9/2009 Boerries et al.
2009/0249198 A1 10/2009 Davis et al.
2009/0271370 A1 10/2009 Jagadish et al.
2009/0300546 A1 12/2009 Kwok et al.
2009/0306981 A1 12/2009 Cromack et al.
2009/0313573 A1 12/2009 Paek et al.
2009/0319329 A1 12/2009 Aggarwal et al.
2010/0009332 A1 1/2010 Yaskin et al.
2010/0030715 A1 2/2010 Eustice et al.
2010/0049534 A1 2/2010 Whitnah
2010/0057859 A1 3/2010 Shen et al.
2010/0062753 A1 3/2010 Wen et al.
2010/0077041 A1 3/2010 Cowan et al.
2010/0082693 A1 4/2010 Hugg et al.
2010/0094869 A1 4/2010 Ebanks
2010/0131447 A1 5/2010 Creutz et al.
2010/0153832 A1 6/2010 Markus et al.
2010/0161729 A1 6/2010 Leblanc et al.
2010/0164957 A1 7/2010 Lindsay
2010/0169327 A1 7/2010 Lindsay
2010/0174784 A1 7/2010 Levey et al.
2010/0185610 A1 7/2010 Lunt
2010/0191844 A1 7/2010 He et al.
2010/0216509 A1 8/2010 Riemer et al.
2010/0228560 A1 9/2010 Balasaygun et al.
2010/0229096 A1 9/2010 Maiocco et al.
2010/0229223 A1 9/2010 Shepard
2010/0235375 A1 9/2010 Sidhu et al.
2010/0241579 A1 9/2010 Bassett et al.
2010/0241639 A1* 9/2010 Kifer ................. G06F 17/30616
707/754
2010/0250682 A1 9/2010 Goldberg et al.
2010/0275128 A1 10/2010 Ward et al.
2010/0281535 A1 11/2010 Perry et al.
2010/0306185 A1 12/2010 Smith
2010/0330972 A1 12/2010 Angiolillo
2011/0010423 A1 1/2011 Thatcher et al.
2011/0035451 A1 2/2011 Smith et al.
2011/0040726 A1 2/2011 Crosbie et al.
2011/0066615 A1* 3/2011 Pradhan et al. .............. 707/737
2011/0087747 A1 4/2011 Hirst et al.
2011/0087969 A1 4/2011 Hein et al.
2011/0098846 A1* 4/2011 Yeung ....................... B07C 3/12
700/224
2011/0145192 A1 6/2011 Quintela et al.
2011/0145219 A1 6/2011 Cierniak et al.
2011/0173547 A1 7/2011 Lewis et al.
2011/0191337 A1 8/2011 Cort et al.
2011/0191340 A1 8/2011 Cort et al.
2011/0191717 A1 8/2011 Cort et al.
2011/0196802 A1 8/2011 Ellis et al.
2011/0202532 A1 8/2011 Nakazawa et al.
2011/0225173 A1* 9/2011 Gulhane et al. .............. 707/749
2011/0225293 A1 9/2011 Rathod
2011/0276396 A1 11/2011 Rathod
2011/0282905 A1 11/2011 Polis et al.
2011/0291933 A1 12/2011 Holzer
2011/0298701 A1 12/2011 Holzer
2012/0011204 A1 1/2012 Morin et al.
2012/0017158 A1 1/2012 Maguire et al.
2012/0036254 A1 2/2012 Onuma
2012/0054681 A1 3/2012 Cort et al.
2012/0078883 A1* 3/2012 Melby ........................... 707/722
2012/0150979 A1 6/2012 Monaco
2012/0232955 A1 9/2012 Riazzi et al.
2012/0246065 A1 9/2012 Yarvis et al.
2012/0259834 A1 10/2012 Broder et al.
2013/0006634 A1 1/2013 Grokop et al.
2013/0014021 A1 1/2013 Bau et al.
2013/0080915 A1 3/2013 Lewis et al.
2013/0091288 A1 4/2013 Shalunov et al.
2013/0262477 A1 10/2013 Monaco et al.
2014/0087687 A1 3/2014 Brezina et al.
2014/0095433 A1 4/2014 Cort et al.
2014/0100861 A1 4/2014 Ledet
2014/0115086 A1 4/2014 Chebiyyam
2014/0207761 A1 7/2014 Brezina et al.
2014/0214981 A1 7/2014 Mallet et al.
2014/0280094 A1 9/2014 Brandstetter
2014/0280097 A1 9/2014 Lee et al.
2014/0287786 A1 9/2014 Bayraktar et al.
2016/0070787 A1 3/2016 Brezina et al.
2017/0187663 A1 6/2017 Brezina et al.
2017/0302749 A1 10/2017 Brezina et al.
2017/0324821 A1 11/2017 Brezina et al.

FOREIGN PATENT DOCUMENTS

JP 2007249307 9/2007
KR 20060056015 5/2006

(56) References Cited

FOREIGN PATENT DOCUMENTS

| | | |
|---|---|---|
| KR | 1020090068819 | 6/2009 |
| KR | 1020090112257 | 10/2009 |
| KR | 1020090115239 | 11/2009 |
| KR | 1020020060386 | 8/2012 |
| WO | 2003098515 | 11/2003 |
| WO | 2007037875 | 4/2007 |
| WO | 2007143232 | 12/2007 |
| WO | 2012082886 | 6/2012 |
| WO | 2012082929 | 6/2012 |

OTHER PUBLICATIONS

Culotta, Aron et al., "Extracting Social Networks and Contact Information from Email and the Web," Proceedings of the First Conference on Email and Anti-Spam (CEAS), Mountain View, CA, Jul. 30-31, 2004 (document provided includes third-party comments submitted under the USPTO PeerToPatent program).

European Patent Application No. 11849271.9, Extended Search Report, dated Apr. 3, 2014.

European Patent Application No. 12801970.0, Extended Search Report, dated Oct. 23, 2014.

European Patent Application 12801998.1, Extended Search Report, dated Feb. 10, 2015.

Extended European Search Report, EP 10 78 3783, dated Mar. 24, 2014.

Fitzpatrick, Brad, "AddressBooker," Github Social Coding, located at http://addressbooker.appspot.com/, Nov. 28, 2008 (document provided includes third-party comments submitted under the USPTO PeerToPatent program).

Google Inc. "OpenSocial Tutorial," located at http://code.google.com/apis/opensocial/articles/tutorial/tutorial-0.8.html, Aug. 2008.

Google Inc., "Automatic Updating of Contacts," Gmail help forum, located at http://74.125.4.16/support/forum/p/gmail/thread?tid=03f7b692150d9242&hl=en, Apr. 27, 2009 (document provided includes third-party comments submitted inder the USPTO PeerToPatent program).

Hillebrand, Tim, "Plaxo: The Smart Auto Update Address Book," Smart Phone Mag, located at http://www.smartphonemag.com/cms/blogs/9/plaxo_the_smart_auto_update_address_book, Nov. 6, 2006 (document provided includes third-party comments submitted under the USPTO PeerToPatent program).

International Patent Application PCT/US10/52081, International Search Report and Written Opinion, dated May 20, 2011.

International Patent Application PCT/US10/56560, International Search Report and Written Opinion, dated Jun. 21, 2011.

International Patent Application PCT/US11/64958, International Search Report and Written Opinion, dated Jul. 31, 2012.

International Patent Application PCT/US2011/064892, International Search Report and Written Opinion, dated Aug. 22, 2012.

International Patent Application PCT/US2012/043507, International Search Report and Written Opinion, dated Jan. 3, 2013.

Oberhaus, Kristin, "Look for Cues: Targeting Without Personally Identifiable Information," W3i, LLC blog entry located at http://blog.w3i.com/2009/09/03/looking-for-cues-targeting-without-personally-identifiable-information/, Sep. 3, 2009.

OpenSocial Foundation, "Social Application Tutorial (v0.9)," located at http://wiki.opensocial.org/index.php?title=Social_Application_Tutorial, accessed Oct. 8, 2010.

PCWorld Communications, Inc., "Your Contacts Are Forever: Self-Updating Address Book," located at http://www.pcworld.com/article/48192/your_contacts_are_forever_selfupdating_address_book.html, May 1, 2001 (document provided includes third-party comments submitted under the USPTO PeerToPatent program).

U.S. Appl. No. 61/407,018, filed Oct. 27, 2010.

W3i, LLC, "Advertiser Feedback System (AFS)," company product description. Sep. 22, 2009.

Wikimedia Foundation, Inc., "Machine Learning," Wikipedia encyclopedia entry located at http://en.wikipedia.org/wiki/Machine_learning, Jan. 30, 2011.

Bernstein, Michael S. et al., "Enhancing Directed Content Sharing on the Web," Proceedings of the 28th International Conference on Human Factors in Computing Systems, Atlanta, GA, Apr. 10-15, 2010, pp. 971-980.

Carvalho, Vitor R. et al., "Ranking Users for Intelligent Message Addressing," Proceedings of the 30th European Conference on Information Retrieval, Glasgow, England, Mar. 30-Apr. 3, 2008, pp. 321-333.

Elsayed, Tamer et al., "Personal Name Resolution in Email: A Heuristic Approach," University of Maryland Technical Report No. TR-LAMP-150, Mar. 17, 2008.

International Patent Application PCT/US10/34782, International Search Report, dated Dec. 22, 2010.

International Patent Application PCT/US10/35405, International Search Report and Written Opinion, dated Jan. 3, 2011.

International Patent Application PCT/US12/043523, International Search Report and Written Opinion, dated Nov. 28, 2012.

Microsoft Corporation, "About AutoComplete Name Suggesting," Microsoft Outlook 2003 help forum, located at http://office.microsoft.com/en-us/outlook/HP063766471033.aspx, 2003.

* cited by examiner

Crowdsourcing Outbound

We don’t have complete phone number information on Xobni user X, but we can infer more complete data based on emails sent.

Crowdsourcing Inbound

We can also figure out phone numbers of NON-Xobni users (in this case user A) by the emails received by existing Xobni users (X, Y, and Z).

Sample Observation Parsing

```
From: rick@gmail.com
To: jason@yahoo.com
Subject: London

Dear Jason,

I moved to London, my new cell is (011)44 0845-430-7676.   <-- extracted (CORRECT #)
My address is Box 1277-23,745 Hamstead Road.               <-- not extracted
Also, my brother just got married, you should give
him a call sometime at his home 650-123-4567               <-- extracted (INCORRECT #)

Cheers,
Rick
```

FIG. 3

Privacy Enforced Via the API
Jeff's data
Xobni One
What's the likelihood that "650-575-3590" belongs to peter@monacofamily.org?
elcaro

Examples (via the high-security interface)

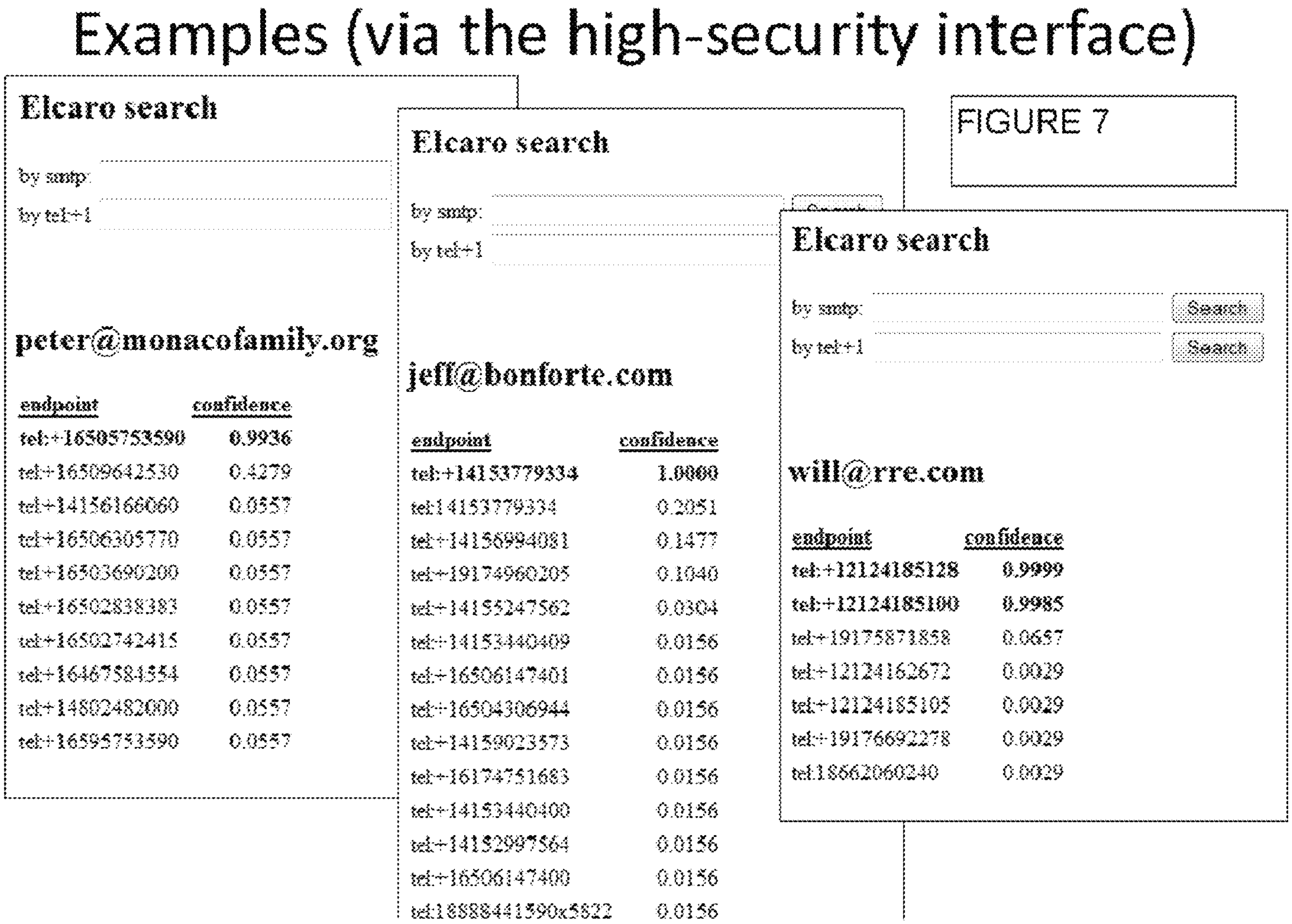

FIGURE 7

Elcaro search by smtp
by tel+1 peter@monacofamily.org

| endpoint | confidence |
|---|---|
| tel:+16505753590 | 0.9936 |
| tel:+16509642530 | 0.4279 |
| tel:+14156166060 | 0.0557 |
| tel:+16506305770 | 0.0557 |
| tel:+16503690200 | 0.0557 |
| tel:+16502833393 | 0.0557 |
| tel:+16502742415 | 0.0557 |
| tel:+16467584354 | 0.0557 |
| tel:+14802482000 | 0.0557 |
| tel:+16505753590 | 0.0557 |

Elcaro search by smtp
by tel+1 jeff@bonforte.com

| endpoint | confidence |
|---|---|
| tel:+14153779334 | 1.0000 |
| tel:14153779334 | 0.2051 |
| tel:+14156984031 | 0.1477 |
| tel:+19174960205 | 0.1040 |
| tel:+14152347562 | 0.0304 |
| tel:+14153440409 | 0.0156 |
| tel:+16506147401 | 0.0156 |
| tel:+16504306944 | 0.0156 |
| tel:+14156023573 | 0.0156 |
| tel:+16174751683 | 0.0156 |
| tel:+14153440400 | 0.0156 |
| tel:+14152997564 | 0.0156 |
| tel:+16506147400 | 0.0156 |
| tel:16888441590x5822 | 0.0156 |

Elcaro search by smtp
by tel+1 will@rre.com

| endpoint | confidence |
|---|---|
| tel:+12124185128 | 0.9999 |
| tel:+12124185100 | 0.9985 |
| tel:+19175873858 | 0.0657 |
| tel:+12124162672 | 0.0029 |
| tel:+12124185105 | 0.0029 |
| tel:+19176692278 | 0.0029 |
| tel:18662060240 | 0.0029 |

Search
Search

Bayes' Theorem $$P(A|w) = \frac{P(w|A) \times P(A)}{P(w)}$$

FIG. 19

A: the word is part of an address
w: the word is 'meadow'

P(w|A) = frequency of the word 'meadow' in the data corpus (≈ 1 / 8,500)
P(w) = frequency of the word 'meadow' in the English language (≈ 1 / 430,000)
P(A) = probability that a word is part of an address (unknown but assumed to be constant)

Since P(A) is a constant, it can be dropped and everything remains proportional. P(A|w) is then no longer a probability, but is instead treated as a score.

Address Likelihood

FIG. 20

A(word) > 1 is likely address, < 1 is likely English

A("meadow") = (1/8,500) / (1/430,000) ≈ 50

Other word examples:

A("street") = 72.75

A("thanks") = 0.001

Words where A(w) ≈ 1 : "symphony", "vulcan", "spindle", "serenity"

Examples of Words

FIG. 21

- Top 3 “Address” words:

1) 6 (e.g., a 1-digit number) score: 13.4
2) “tx” score: 12.35 (e.g., Texas, and tx is never used in English)
3) “los” score: 11.36 (e.g., lots o’ cities)

- Top 3 “English” words:

1) “didn” score: -10.18 (e.g., no you didn?)
2) “what” score: -9.89 (common in English and no streets or towns are named “What”)
3) “thing” score: -9.78 (same situation as “what”)

Naïve Classifier

FIG. 22

Naïve Bayesian Classifier says that all the probabilities can be multiplied together to get the overall probability (here, it's the score since P(A) is unknown). For a sequence of words:

$$\text{Score} = A(w_1) \text{ x } A(w_2) \text{ x } .... \text{ x } A(w_n)$$

Logarithms

FIG. 23

The numbers can get very large or small potentially leading to rounding error, so instead the numbers are transformed to logarithms. Then, the scores can be added (so that now B(word) > 0 are address-like, and B(word) < 0 and English-like) as follows:

Let $B(w_i) = LOG_{10}(A(w_i))$ then:

$$score(w_{1\text{-}n}) = B(w_1) + B(w_2) + \ldots. + B(w_n)$$

B(w) is computed for the most frequent 60,000 English and address words in a database (data training set).

ADDRESS EXTRACTION FROM A COMMUNICATION

CROSS-REFERENCE TO RELATED APPLICATIONS

The present application is related to U.S. Provisional Pat. App. Ser. No. 61/616,486, filed Mar. 28, 2012, entitled "Using Observations of a Person to Determine if Data Corresponds to the Person"; U.S. patent application Ser. No. 12/180,502, filed Jul. 25, 2008, entitled "Method and System for Display of Information in a Communication System Gathered from External Sources" and published as U.S. Pat. App. Pub. No. 2009-0031232; U.S. patent application Ser. No. 12/180,489, filed Jul. 25, 2008, entitled "Display of Profile Information Based on Implicit Actions" and published as U.S. Pat. App. Pub. No. 2009-0030940; U.S. patent application Ser. No. 12/180,483, filed Jul. 25, 2008, entitled "Display of Attachment Based Information within a Messaging System" and published as U.S. Pat. App. Pub. No. 2009-0030872; U.S. patent application Ser. No. 12/180,498, filed Jul. 25, 2008, entitled "Display of Information in Electronic Communications" and published as U.S. Pat. App. Pub. No. 2009-0030933; U.S. patent application Ser. No. 12/180,469, filed Jul. 25, 2008, entitled "Display of Communication System Usage Statistics" and published as U.S. Pat. App. Pub. No. 2009-0031244; U.S. patent application Ser. No. 12/180,453, filed Jul. 25, 2008, entitled "Method and System for Collecting and Presenting Historical Communication Data for a Mobile Device" and published as U.S. Pat. App. Pub. No. 2009-0029674; the disclosures of which applications are hereby incorporated herein by reference in their entirety.

FIELD OF THE TECHNOLOGY

At least some embodiments disclosed herein relate to electronic data processing in general, and more particularly, but not limited to, extraction of an address or other string from one or more communications.

BACKGROUND

Data mining involves discovering new patterns from large data sets and may involve use of artificial intelligence, statistics and database systems. A typical goal of data mining is to extract knowledge from a large data set. In data mining, large quantities of data typically are automatically analyzed to extract, for example, patterns such as groups of data or dependencies among data.

SUMMARY OF THE DESCRIPTION

Systems and methods to extract addresses or strings from communications are described herein. Some embodiments are summarized in this section.

In one embodiment, a method implemented in a data processing system includes: receiving a communication comprising a plurality of strings (e.g., words in a text message); assigning a score to each of the strings, wherein the score assigned to each of the strings corresponds to a frequency of usage of the respective string for a first function (e.g., usage of a word as part of an address) relative to an overall frequency of usage of the respective string (e.g., usage of the word in the English language); determining a respective total sum for each of a plurality of sequences in the communication (e.g., sequences having a length of five words), the respective total sum determined as a sum of the scores for each string in the respective sequence; and extracting a first sequence (e.g., an address of a sender of an e-mail) of the sequences from the communication based on the total sum for the first sequence. In one embodiment, the method further includes identifying the first sequence as having a total sum that is greater than a threshold value (e.g., a predetermined numerical cut-off value), and the extracting the first sequence is responsive to the identifying (e.g., the address is extracted if the total sum is equal to or greater than the cut-off value).

The present disclosure is illustrative of inventive features to enable a person skilled in the art to make and use the techniques. Various features, as described herein, should be used in compliance with all current and future rules, laws and regulations related to privacy, security, permission, consent, authorization, and others.

The disclosure includes methods and apparatuses which perform the above methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 3 shows a sample observation parsing and extraction of data from an e-mail, according to one embodiment.

FIG. 7 shows examples of search results returned from the repository in response to a query associated with a person or user, according to one embodiment.

FIG. 19 illustrates Bayes' theorem and its application to determining a probability that a word is part of an address given that a particular word is present in a communication, according to one embodiment.

FIG. 20 illustrates examples of words being more or less likely used in an address of a communication, according to one embodiment.

FIG. 21 illustrates examples of top-rated address words and top-rated English words, according to one embodiment.

FIG. 22 illustrates a Bayesian classifier that multiplies word probabilities together to determine an overall probability, according to one embodiment.

FIG. 23 illustrates the transformation of a score for a word sequence as illustrated in FIG. 22 into a logarithmic score, according to one embodiment.

DETAILED DESCRIPTION

Figure 1:
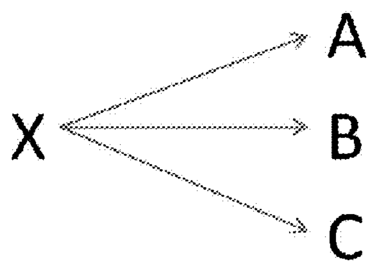
FIG. 1 shows the inference of more complete data based on e-mails sent by person X, according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Using Observations to Determine if Data Corresponds to a Person

At least one embodiment of the disclosure provides a method including: receiving or making, via a first computing device, observations of a person; storing the observations in a repository; and determining whether data in a first observation corresponds to the person, wherein the determining is based on the plurality of observations. For example, observations may be based on data received from another computing device such as data extracted from messages from a sender. In another example, observations may be based on data obtained from a mobile device of the person (i.e., the data can be obtained by making a local observation on the mobile device and does not need to be received from a different computing device such as a server or other user mobile device).

In one embodiment, the method further includes receiving, from a second computing device, a query requesting at least one confidence for ranking a list of data items to be presented on a display (e.g., a screen of a mobile phone) for one of the plurality of recipients. Some examples for computing or calculating the confidence are provided below.

In one example, these recipients are users of the Xobni address book and person profiling services (see, e.g., personal contacts service and software at www.xobni.com, which website information is incorporated by reference herein). Xobni as used herein is not intended to be limiting, and is presented as merely one example of a provider of services that uses the exemplary Elcaro server and Xobni One computing systems/platforms. In one embodiment, a result from the determining is used to select or rank information from a person profile for presentation to a user of a computing device. In another embodiment, the method further includes using a result from the determining for caller identification (e.g., using the result to rank or prioritize information to be presented to the user of the mobile phone when a caller has been identified). In one embodiment, the person profile is a profile for a caller of a phone call to the user.

In another embodiment, a method includes: receiving or making observations for a sender having an address; storing the observations in a repository; and determining based on the plurality of observations whether data in a first observation corresponds to the address of the sender.

In one embodiment, each of the plurality of observations is a message addressed to a different recipient, and the address is an e-mail address. In one embodiment, the method further includes, prior to the determining whether the data corresponds to the address, determining whether the data was previously sent to a user of a mobile device.

In one embodiment, the method further includes providing a result from the determining only if the sender is in a social network of a user. In one embodiment, the method further includes accessing, over a network, a social network server to determine the social network of the user.

In one embodiment, the method further includes computing a confidence that the data corresponds to the address. The data may be selected from the group consisting of a phone number, a street address, and a company name. As an example, the plurality of observations may be a number of messages from the sender (e.g., at least ten, 100, or 500 messages).

In one embodiment, each of the plurality of observations is an e-mail, a text message, or a phone call. In one embodiment, the repository is a database implemented on at least one server.

In one embodiment, a computing apparatus includes at least one processor and memory storing instructions configured to instruct the at least one processor to perform any of the above methods. In one embodiment, a non-transitory computer-storage medium stores instructions configured to instruct a computing apparatus to perform any of the above methods.

In one embodiment, user data is combined from across a large user base (e.g., person profile data from Xobni service users), to come up with more accurate information about the population as a whole (e.g., the entire Xobni user population and/or the population of persons sending messages to Xobni users). For example, the data may be analyzed to determine which persons are associated with phone numbers in the data (e.g., phone numbers extracted from messages sent to Xobni users are determined or correlated as being the home or mobile phone number of particular senders of the messages).

Figure 13:
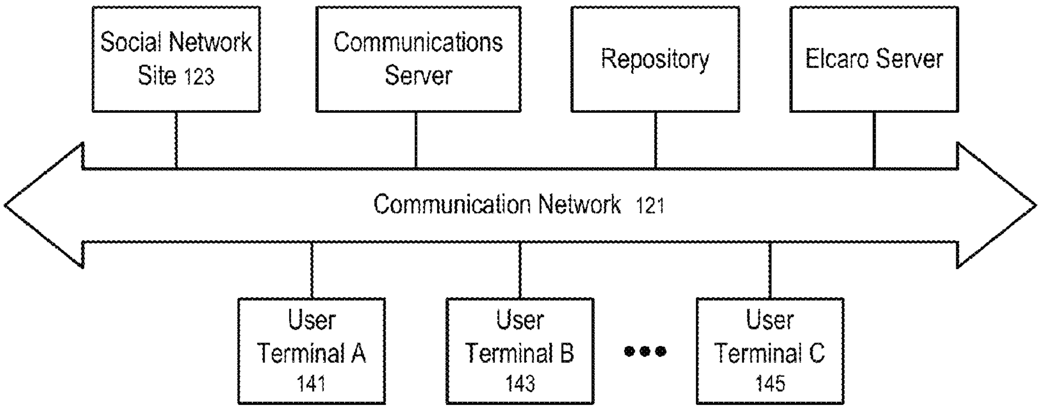
FIG. 13 shows a system to store observations and determine a correspondence of data to a person, according to one embodiment.

FIG. 13 shows a system according to one embodiment to store observations and determine a correspondence of data to a person (e.g., via computation of a confidence or other score of the degree of such confidence) as discussed in more detail below. In FIG. 13, the user terminals (e.g., 141, 143, . . . , 145) may communicate with a communications server and/or an online social network site 123 over a communication network 121. The communications server and/or the social network site 123 each may include one or more web servers (or other types of data communication servers) to communicate with the user terminals (e.g., 141, 143, . . . , 145). In one example, the user terminal is a mobile device such as a smart phone or an iPad or tablet device.

The communications server may store respective person profiles for many users (e.g., of the Xobni service mentioned above) such as recipients of e-mails or other messages from senders (e.g. a sender of an e-mail using a user terminal). The communications server receives or makes observations for a person, and sends these observations to a repository (e.g. via communication network 121). In one example, this repository is implemented as a database running on at least one server connected to communication network 121 (illustrated here and discussed herein merely for exemplary purposes as the "Elcaro server", which is operated for example by the illustrative Xobni service provider). Other computing devices/systems may be used that provide the same or similar functions as illustrated herein for the Elcaro server.

Queries or questions may be submitted from the communications server to the Elcaro server, which may provide results or answers back to the communications server. These queries or questions may be associated with providing an information display or other actions or services for one of many users associated with the communications server (e.g., providing ranked results in a display on a mobile device of a Xobni user).

The online social network site 123 may be connected to a data storage facility to store user provided content, such as multimedia content, preference data, etc. In FIG. 13, the users may use the terminals (e.g., 141, 143, . . . , 145) to send or receive communications, such as e-mails. For example, the communications server may receive a copy of these e-mails, and/or otherwise be involved in the communication of these e-mails. For example, data may be extracted from these e-mails to use in creating a plurality of person profiles for a number of users (e.g., users of the Xobni service). The person profiles are stored on the communications server, or on another computing device (e.g., accessible by or in communication with the communications server). These person profiles may be used to rank or prioritize information presented to a user of a user terminal, and/or other actions or services provided to the user.

Although FIG. 13 illustrates an exemplary system implemented in client server architecture, embodiments of the disclosure can be implemented in various alternative architectures. In some embodiments, a combination of client server architecture and peer to peer architecture can be used, in which one or more centralized servers may be used to provide some of the information and/or services, and the peer to peer network is used to provide other information and/or services. Thus, embodiments of the disclosure are not limited to a particular architecture.

FIG. 1 shows the inference of more complete data based on e-mails sent by person X, according to one embodiment. Person X sends messages to persons A, B, and C. Data can be extracted from each of these messages and sent to the repository. More complete data about person X can be inferred based on these messages. Person X is, for example, a user of the Xobni service mentioned above.

Figure 2:
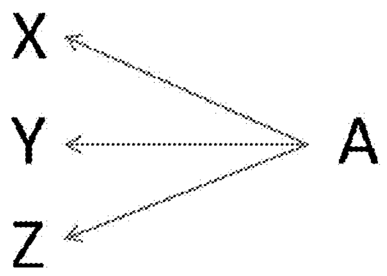
FIG. 2 shows the determination of phone numbers of a person A sending e-mails to existing users X, Y, Z of the Xobni service, according to one embodiment.

FIG. 2 shows the determination of phone numbers of a person A sending e-mails to existing users X, Y, and Z of the Xobni service, according to one embodiment. Person A is, for example, not a member of the Xobni service. In contrast, users X, Y, and Z are users each having a person profile maintained by the Xobni server. This is an example of using crowd-sourcing based on inbound messages to various users of the Xobni service. Data extracted from these messages is sent to the repository. As described below, queries are made to the repository to obtain results used to manage newly-received data associated with one of the person profiles of users X, Y, and Z.

FIG. 3 shows a sample observation parsing and extraction of data from an e-mail, according to one embodiment. Here, the body of an e-mail from Rick to Jason includes various information such as phone number and address data. To create or update a person profile for user Rick, it is desired to determine which of this various information corresponds to Rick.

For example, it is desired to extract the mobile phone number for Rick and update his personal profile with this number. Parsing is used to identify portions of the e-mail body that are believed to be a phone number. As illustrated here, two phone numbers have been extracted. However, only one of these two numbers correctly corresponds to Rick as being his personal cell phone number. As described below, a query is made to the repository to determine which of these two numbers should be selected as correctly corresponding to the person profile for Rick.

Figure 4:
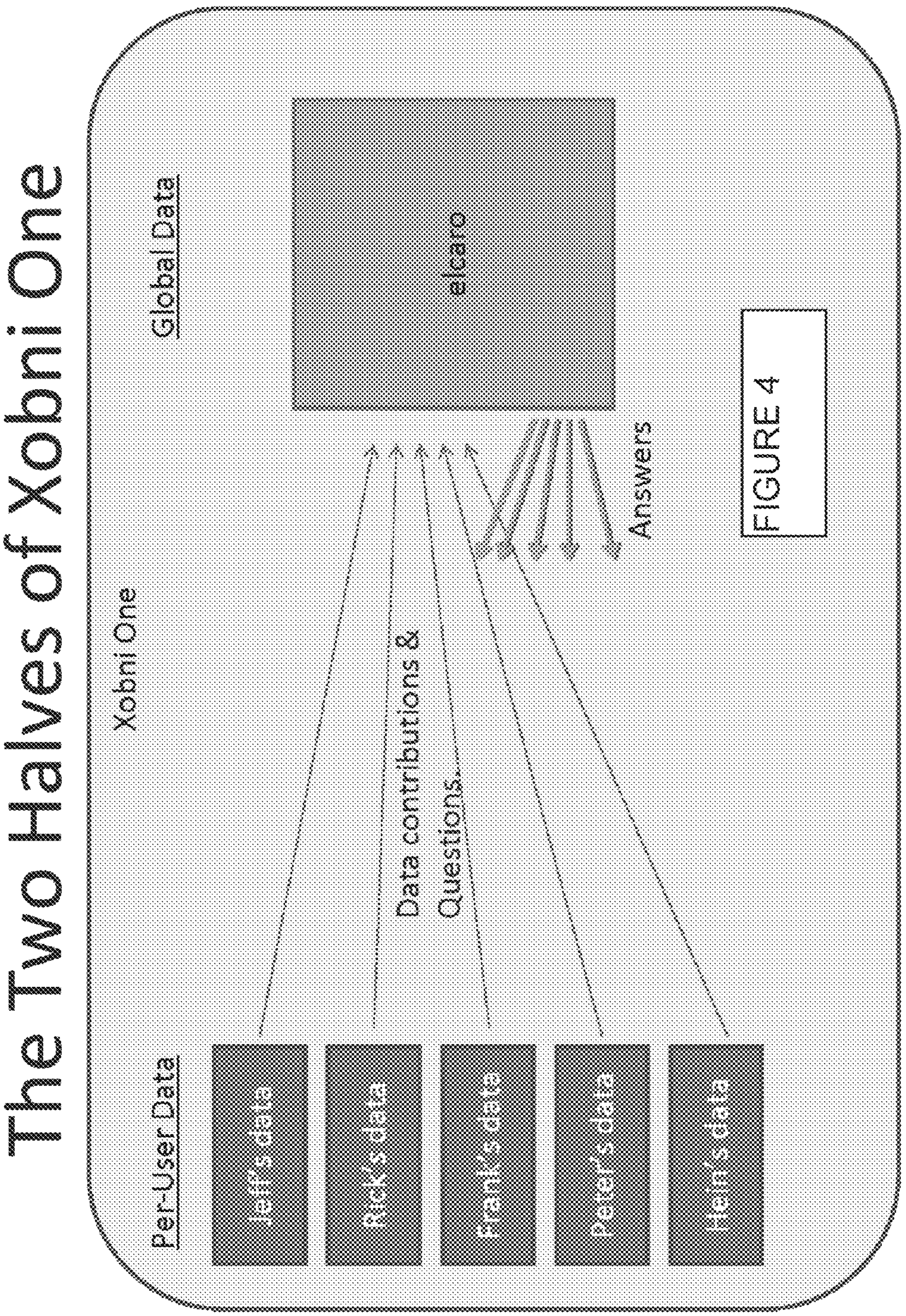
FIG. 4 shows user data for a plurality of users stored as person profiles (for example, Jeffs data and Rick's data) and further shows global data for a large population of persons stored in a repository on a computing device (indicated here as the Elcaro server), according to one embodiment.

FIG. 4 shows user data for a plurality of users stored as person profiles (for example, Jeffs data and Rick's data) and further shows global data for a large population of persons stored in a repository on a computing device (indicated here as the Elcaro server), according to one embodiment. Here, the person profile of user Rick is illustrated as being stored on a user data server along with person profiles for other users. Data is extracted from observations such as phone numbers parsed from messages sent to Rick or communicated to the repository in the Elcaro server. As mentioned above, a query or question may be sent to the repository in order to obtain a result or answer as to whether certain identified data is correlated or associated with a particular user such as Rick. In one embodiment, discussed further below, this result or answer is expressed as a confidence, which may be a numerical score. If the confidence is greater than a predefined threshold value, then the answer is taken as affirmative that the data is correlated to or associated with the particular person.

In one example, the bodies of e-mails are parsed for phone numbers following a set of rules which take into account different countries and formats. The parser can tell if a sequence of numbers is a phone number, but not if it belongs to the sender. At this stage, it is a "raw observation".

Figure 5:
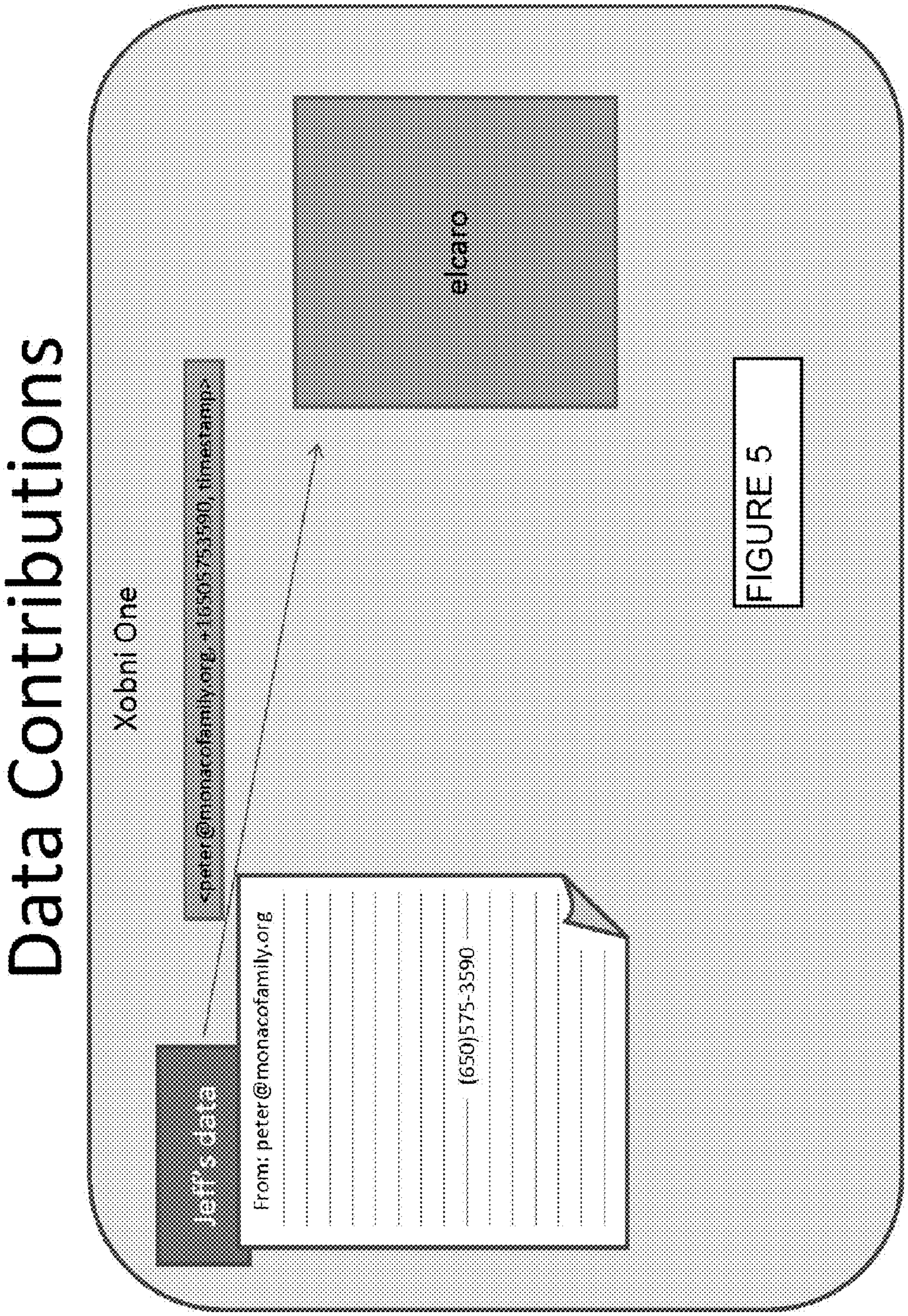
FIG. 5 shows data contributions to the repository from an exemplary message sent from, for example, Peter to Jeff, according to one embodiment.

FIG. 5 shows data contributions to the repository from an exemplary message sent from, for example, Peter to Jeff, according to one embodiment. Here, user Jeff has received a message from Peter that contains data such as Peter's e-mail address, a phone number extracted from the body of the e-mail, and a timestamp. It is desired to determine whether this phone number is associated with the sender of the message, Peter. The address, the phone number, and the timestamp are sent as a data contribution to the repository.

Figure 6:
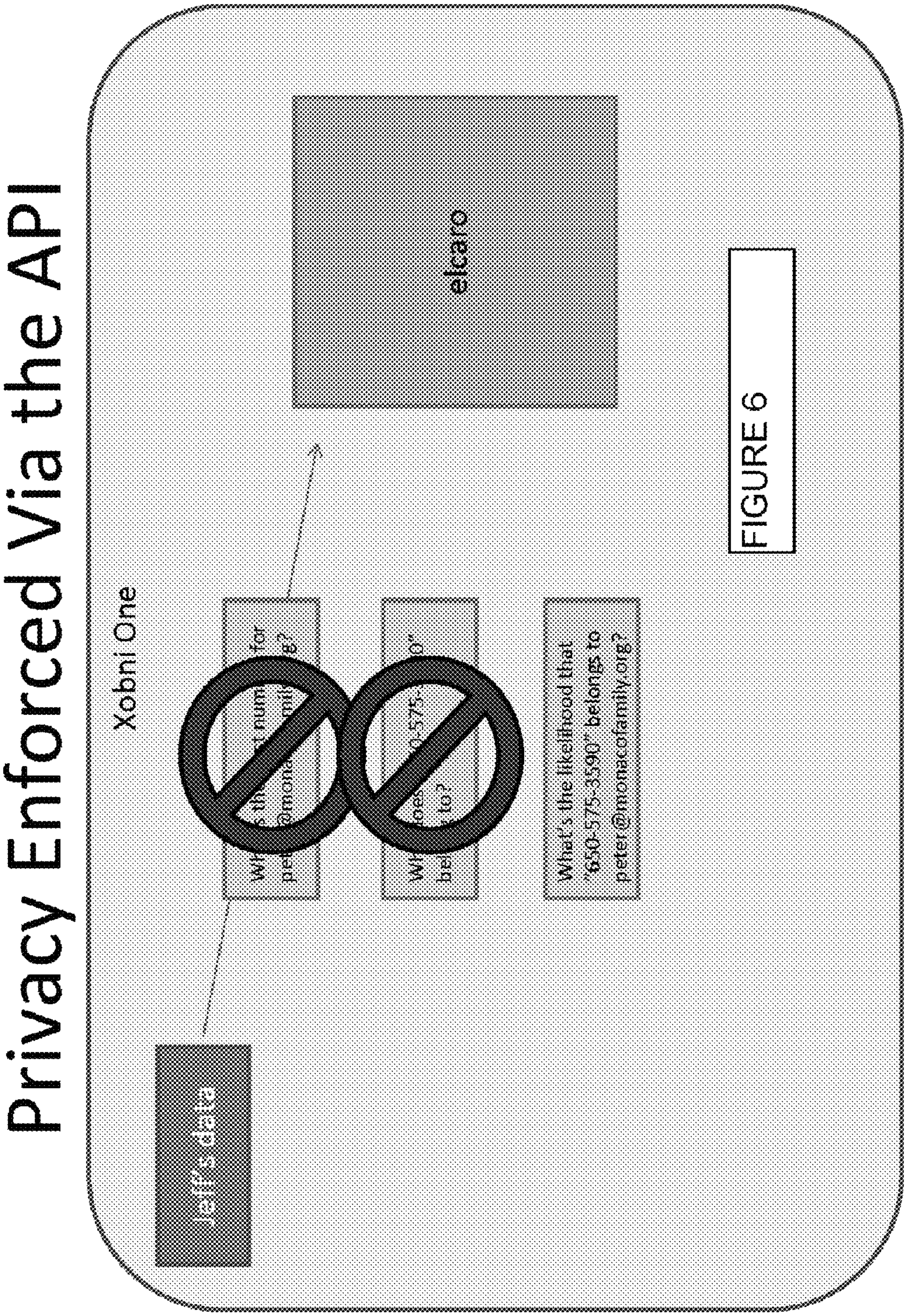
FIG. 6 shows enforcement of a privacy policy via an application program interface (API), according to one embodiment.

FIG. 6 shows enforcement of a privacy policy via an application program interface (API), according to one embodiment. More specifically, the API prohibits certain types of queries. For example, user Jeff is not permitted to access data from the repository that provides the phone number for the sender Peter. Also, user Jeff is not permitted to access data indicating the person for which the extracted phone number belongs to. Instead, user Jeff is limited to a query regarding whether the extracted phone number belongs to or is associated with the sender Peter.

FIG. 7 shows examples of search results returned from the repository in response to a query associated with a person or user, according to one embodiment. Each of the search results illustrated here provides a confidence for each of several phone numbers previously extracted from messages to a user. For example, a first phone number '590 has a confidence score of 0.9936, whereas a second '554 phone number has a confidence score of 0.0557. The '590 phone number is greater than a threshold value of, for example, 0.98 and is thus deemed to be a phone number that is associated with the sender Peter. The '554 phone number is below the threshold value and is deemed to be not related to the sender Peter.

In one example of a confidence algorithm, a statistical analysis is performed across every unique e-mail address that assigns a confidence value to each unique phone number observed from the address. For example, there may be more than 0.5 billion observations in the repository database. A person may have one or many valid phone numbers. An algorithm determines how many extracted numbers actually belong to the person despite the large variation and quantity of observations made across the system.

Figure 8:
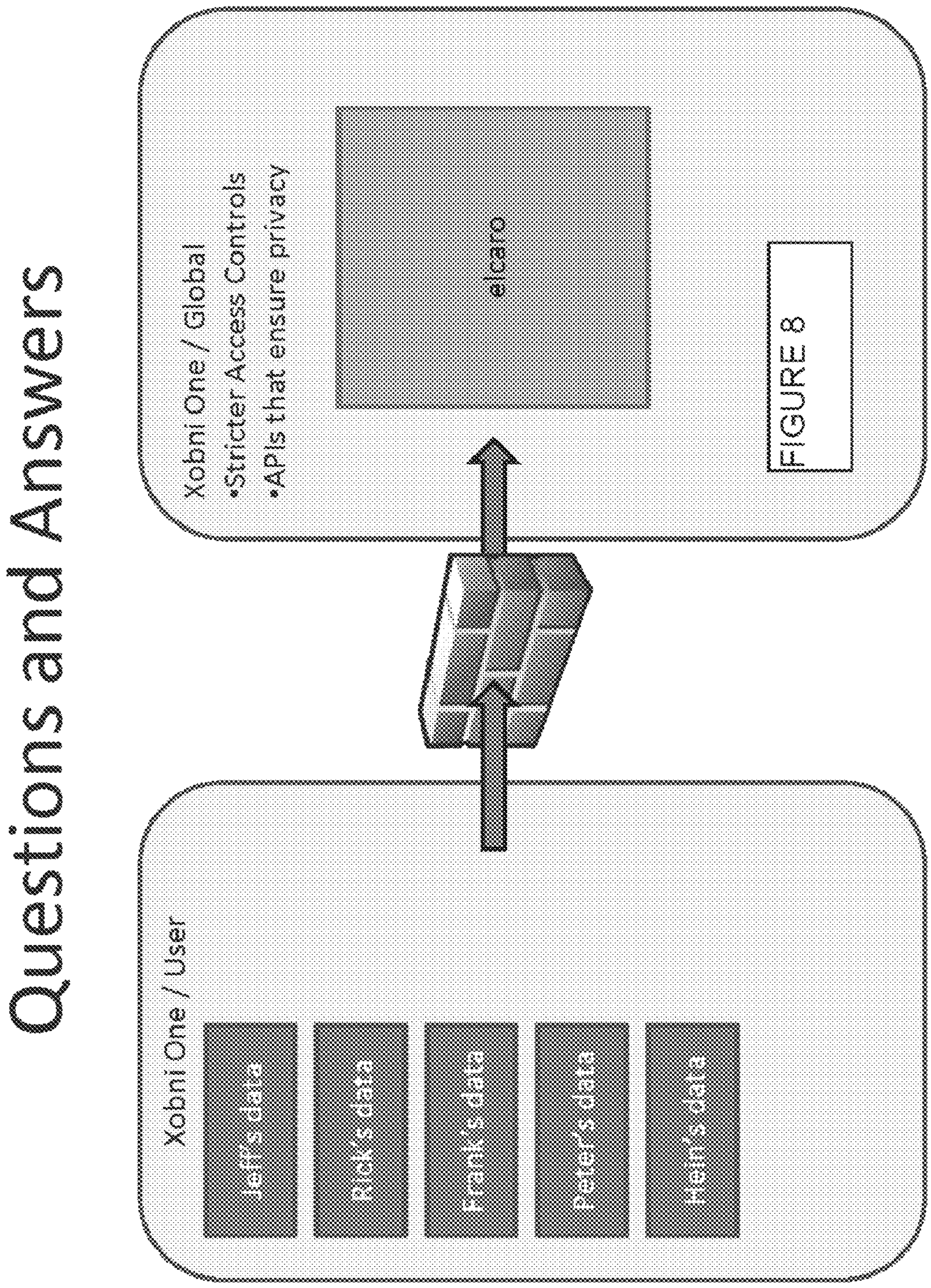
FIG. 8 shows implementation of access controls to ensure privacy of data for persons stored in the repository on the Elcaro server, according to one embodiment.

FIG. 8 shows implementation of access controls to ensure privacy of data for persons stored in the repository on the Elcaro server, according to one embodiment. Queries made to the repository take privacy into account, and a firewall is set up between user data and the server storing the repository. Specifically, in one specific approach, a result to a query regarding a phone number for a person is only provided to a user if that person is a part of the user's social network (e.g., as determined by a data stored on the person profile server, a different server, or a third party social network server). This privacy setting is applied to the global person data in the repository.

For example, consider the case where a user John has been e-mailed numerous phone numbers over the past few years by many different senders. The e-mail addresses of the senders having sent the e-mails to the user John are applied as a filter against all of the data in the repository. So, the user only gets access to results from the repository for those phone numbers that are associated with these prior e-mail addresses. The user does not get access to new phone numbers not previously known to the user. In other words, the global database repository of everyone's phone number and how each phone number is correlated to an e-mail address or person is filtered based on privacy controls for each individual user.

Figure 9:
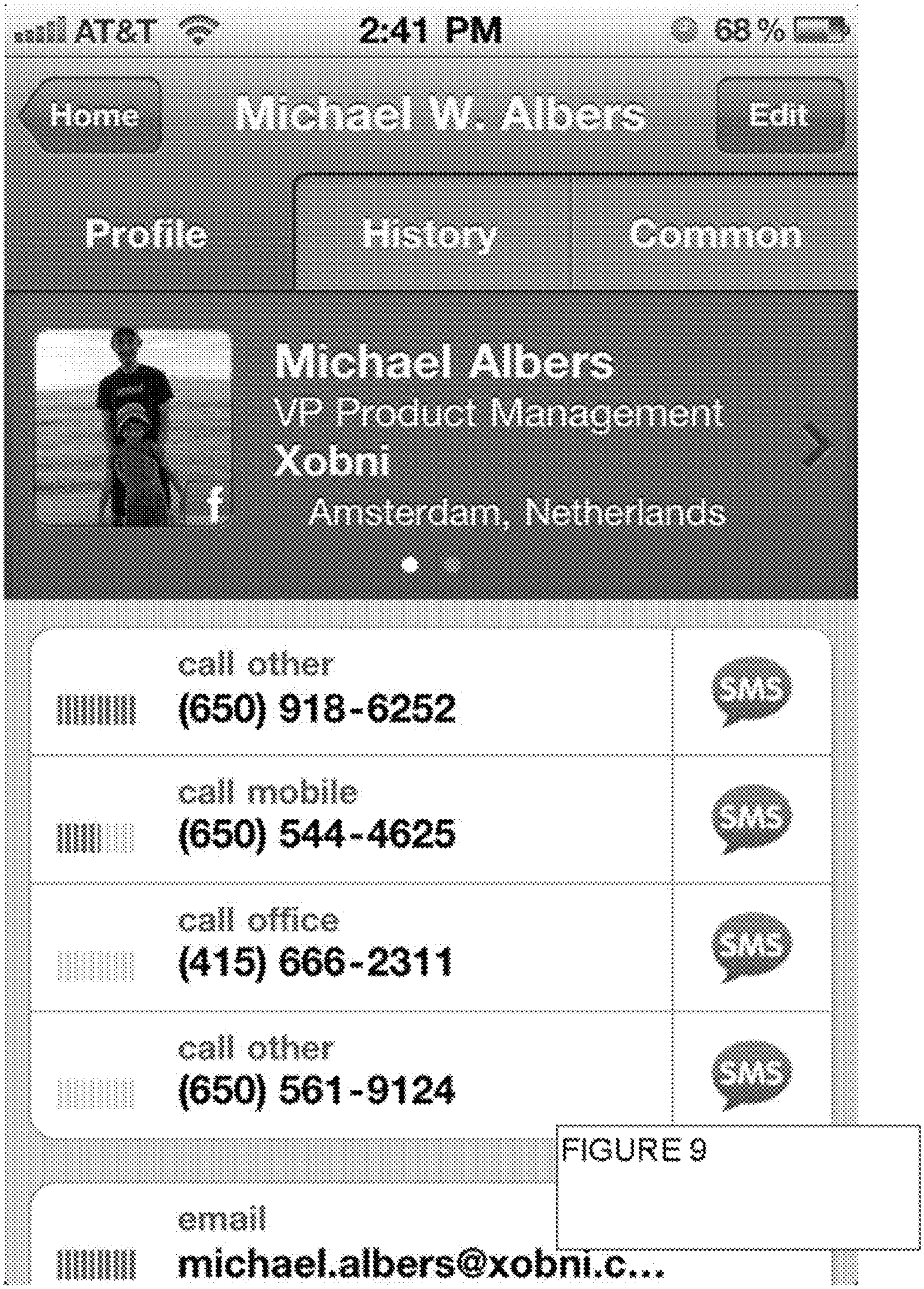
FIG. 9 shows a screen shot of a display of a user mobile device, according to one embodiment.

FIG. 9 shows a screen shot of a display of a user mobile device, according to one embodiment. The display presents a person profile for person Michael Albers, who may be a sender of a message to a user, or may be a person who has been identified as a caller to the user as part of a caller identification system.

The displayed profile lists phone numbers that are presented to the user in a ranked order. Confidence scores generated (e.g., by the Elcaro server storing the repository) are used to rank the phone numbers, and the numbers are displayed to the user in this ranked order. When the list of highest confidence phone numbers (e.g., numbers above the predefined threshold discussed above) is displayed, a signal strength indicator may be provided to indicate the confidence value associated with each phone number. As illustrated here, the signal strength indicator may be a horizontal bar graph indicating the magnitude of the confidence.

In one embodiment, note that if a user himself or herself directly enters a phone number into a contact database or a person profile, then it is assumed (e.g., by the Elcaro server and the person profile server) that the user wants this number associated with the profile of that particular person. So, any confidence score is ignored, and the phone number is treated as being associated that person.

Now, further details are discussed below for various additional non-limiting, exemplary embodiments. In one embodiment, a process may determine whether a phone number and an e-mail address belong to the same person by crowd sourcing communication data as discussed above. More specifically, one can compute the confidence that a phone number found in the body of an e-mail belongs to the sender of the e-mail. By setting a specific cutoff value for the "confidence", one can confirm ownership of the phone number with greater accuracy, if there is sufficient data.

In one example, users of an address/contact service may agree to allow servers to access their e-mail corpus. Since their e-mail corpus includes received e-mails, a system can gather phone number observations from persons who are not a registered user. However, privacy constraints only permit access to this inferred (outsider) phone number data if and only if the person is in the user's network (which may be defined in various conventional ways, such as being a second-order social network). For inbound messages, when friends of a person A join the Xobni service, the friends will have immediate access to correct phone information, without having to wait for person A to join the Xobni service, or respond to a request for person A to provide up-to-date phone numbers.

In one example, data for many persons is globalized. Cleaning up phone numbers for the persons can be done using the method described above. When large numbers of phone numbers are extracted from many e-mails, a system may associate too many phone numbers with a particular person/contact. Persons usually only have one or two primary phone numbers that they use. The approach above permits displaying the most significant phone numbers. A process determines whether a phone number and an e-mail address belong to the same person. This can be done by scanning the entire repository of all phone numbers that have ever been observed through the system (e.g., via messages or other observations).

A number is computed that is called a "confidence". When a phone number and an e-mail are paired as an observation, a query is made as to determine the confidence that the phone number belongs to the sender. A threshold is defined, and if the confidence is above that threshold, it is assumed that the phone number is associated with the person, and every number below that threshold is assumed not to be associated.

Regarding inbound e-mails from non-Xobni users, Xobni has a large number of e-mails from some outside users that are sent to multiple existing Xobni users. The more samples the system has, the greater the confidence that it can be determined that a phone number is that outside user's phone number. For example, if the system sees three or four samples, the system starts to consider that the phone number is associated with that person. Having greater than, for example, fifty samples is an example of greater confidence.

In one embodiment, the neighboring words in an e-mail may be used to determine the phone number type, but are not used to determine the correlation with the e-mail address or the person. As a first step, the parser looks at things like whether a number is an international number or a domestic number. If so, the parser will extract it. After identifying a number, the parser may look at a few words to the left or right to find words like "home" or "fax" in order to identify the type of number. A person may have his or her main number in the signature block of an e-mail, but occasionally the person may put his or her mobile number in the body of an e-mail. The system is able to identify that mobile number from the body of the e-mail. However, for example, the number of a favorite restaurant of a person may also be put into an e-mail. The system is able to avoid associating that restaurant number with the sender.

The method above may be applied to any type of messaging including text messaging. This may also include Facebook or similar messages. Data to be identified or confirmed with a confidence may include, for example, a birth date, an address, or other personal or business data such as employer. These might be considered to be attributes of the sender. These attributes are determined based on a large number of communications by that person.

Figure 10:
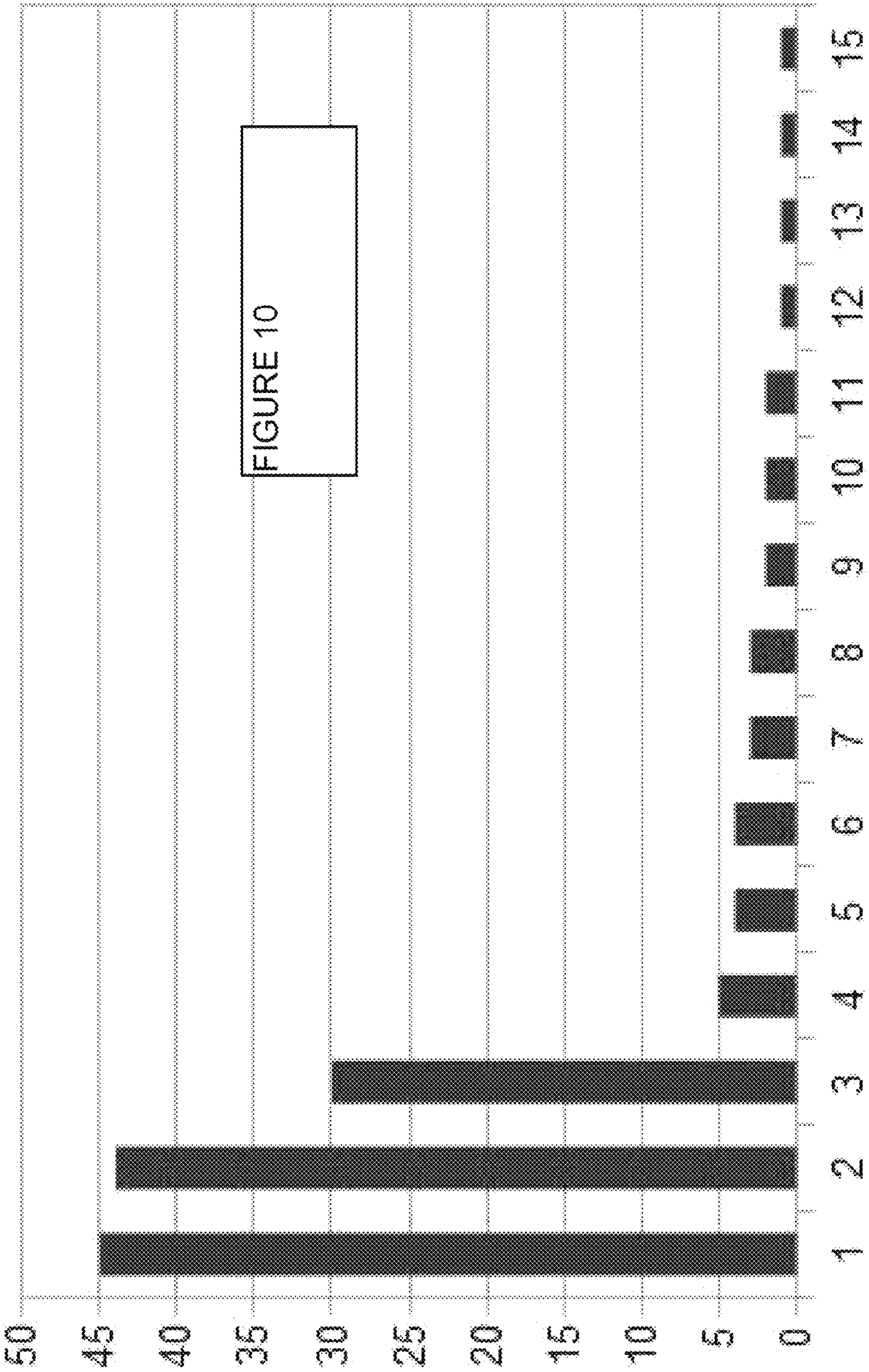
FIG. 10 shows a distribution of phone numbers extracted from sender messages where the distribution has a long tail, according to one embodiment.

Regarding a distribution of observations for a particular sender, there is a pattern to the distribution that may be analyzed by an algorithm. FIG. 10, which is discussed in greater detail below, is an example of such a distribution. The distribution in FIG. 10 is assembled as follows: All observations discovered by the system are stored in a repository (as discussed above). From this repository, all observations from a particular sender are fetched, and then a count is made of the number of these observations that were sent from each phone number.

Some persons might have four phone numbers, while other persons have only one number. The algorithm draws out the distribution, and cuts it at the right point (this is described in greater detail below). For example, one might determine that a first user has two numbers, and another user only has a single number such as a Skype number. It can't be assumed that every person has two phone numbers. Instead, the number of phone numbers will vary for each user. The approach herein can use e-mails from all users in the repository and apply the algorithm to just one person to make a decision. In one embodiment, each message from a sender is treated the same (i.e., as an observation). Each of these observations is summed up as described below. The computed confidence is based on the shape of the distribution. Typically, the distribution has a long tail.

One application of the approach above is that a system could take an iPhone or other address book, and without adding or subtracting any further data, the system could rank the phone numbers or other data in the address book, and clean up the data to indicate which phone number or other data item is currently the best number, and which number or data item may no longer be correct. Thus, accuracy of this address or other data can be increased.

Other applications of computing confidence as discussed herein may include mapping of e-mail addresses to social network IDs. For example, a certain e-mail address belongs to a particular person on Facebook or another social network site.

Another application includes identification of known entities (e.g., a company such as Amazon.com). When a person receives an e-mail from Amazon.com, the e-mail may be from a sender having a name repeated for numerous customers, but sent from the same Amazon.com domain. The system may look at several e-mails, and determine that it is Amazon.com that is sending e-mails to lots of customers (the e-mails look alike in structure). So, a determination is made that the sender is a business entity, and not a human person.

Another application is to build a global social graph (for the system to understand who knows whom, for example similarly to the understanding that Facebook has). For example, a person may have about 10 or 20 unique phone numbers. If a "person" has a very large number, for example 100,000, of unique phone numbers, then the system assumes this is merely an Internet bot.

A specific algorithm in one embodiment for confidence scoring phone numbers is now discussed. Worker jobs run continuously on Xobni clusters that fetch historical e-mails from Xobni users in batches. The bodies of the e-mails are not stored, but instead scanned once and discarded. More specifically, in one embodiment, the Elcaro server uses programs running on computers physically located at an external facility. There are two different jobs:

1) gathering observations from e-mails and placing them into the repository; and 2) running statistics on the observations in the repository, as described in more detail below. These processes run in parallel (i.e., they are always both running simultaneously and do not interfere with each other).

During a scan, a set of regular expressions and specific parsing rules are run on each e-mail to identify and extract phone numbers. Each such extraction is referred to as an "observation". This process is not designed to be perfect, and instead generally errs on the side of false positives (i.e., assuming it's a phone number if we are not sure).

Once an observation has been made, it is stored in the repository (e.g., a MySQL database). The database keeps track of all the unique e-mail addresses it has seen, all the unique phone numbers it has seen, and all unique observations. An observation must be unique along three fields (e-mail_address, phone_number, e-mail_timestamp), which prevents double counting, in case the same e-mail is rescanned in the future.

After the observation has been inserted into the database, the source e-mail address is marked as "dirty", which has the meaning that the entire set of unique phone number confidences for this e-mail address are out-of-date and must be re-computed. This is done because one observation will affect the confidence scores of all other phone numbers observed from this source e-mail address.

A separate process (running in parallel to the observation importer) cleans up dirty e-mail addresses as now described. For each e-mail address, the following steps are performed:

1) Scale all observations with a decay function, making older ones less important. For example, the decay function may have a half-life of 26 weeks (i.e., the observation is 50% as important if 26 weeks old, 25% as important if 52 weeks old, etc.;).

2) Insert artificial noise to prevent degenerate statistical cases and smooth out the results. For every real observation at time t, a fake observation at time t is added. Also, the count of all real observations is increased by one. This ensures that the standard deviation is always computable.

3) Sum all the decayed values for each unique phone number (real and fake). Each phone number for this e-mail address now has a "decayed score".

4) Determine the mean and standard deviation of the decayed scores.

5) For each phone number, compute the distance of it's decayed score from the mean decayed score in standard deviations(s).

6) Apply a squashing function to s, so the range is restricted to [−1, 1]. This is the "confidence" that the phone number belongs to the e-mail address.

The squashing function used is the Logistic Squashing function (http://en.wikipedia.org/wiki/Logistic_function) f(x)=1/(1+e^−x) which scales to the range [0,1]. This is then re-scaled to [−1.0, 1.0] for use in this embodiment.

7) Flag any phone numbers with a confidence greater than a certain cutoff value (e.g., empirically determined to be 0.38) to be "significant", meaning the Elcaro system believes with high confidence that the phone number belongs to the sender of the e-mail.

All confidences are then updated into a separate database table which is the "master record" of confidences. This table is indexed for fast-read by Xobni APIs, so client applications can ask the Elcaro server/system for the confidence of an (e-mail_address, phone_number) pair, then use this information to either remove the number (in the case of a low confidence) or for ranking a set of phone numbers or other data.

To protect privacy, the client application may only ask the Elcaro server/system about phone numbers that it is already aware of. If user X has sent user Y an e-mail with phone number P in it, then user Y may ask the Elcaro server/system what is: confidence (X,P)? This protects user X's privacy, while simultaneously giving user Y the benefit of the global knowledge contained in the confidence score.

FIG. 10 shows a distribution of phone numbers extracted from sender messages where the distribution has a long tail, according to one embodiment. For every unique phone number that is sent from a user, there is a rectangle placed on the X axis (horizontal axis) of FIG. 10. The height of each rectangle represents the number of times that the number has been seen. It is a standard histogram, such as for example found at (http://en.wikipedia.org/wiki/Histogram). In FIG. 10, the rectangles are arranged from highest to lowest, for simplicity, but only the height is of relevance here (the particular arrangement of the rectangles along the X axis is not critical).

The "fake" observations discussed above are necessary to handle degenerate statistical cases. The confidence score assumes there is a distribution of phone numbers with a long tail: a few numbers with a lot of observations, then lots of observations of different (incorrect) phone numbers (see, e.g., FIG. 10). If this assumption is true, then the system can use the mean and standard deviation to compute the confidence as described above.

Figure 11:
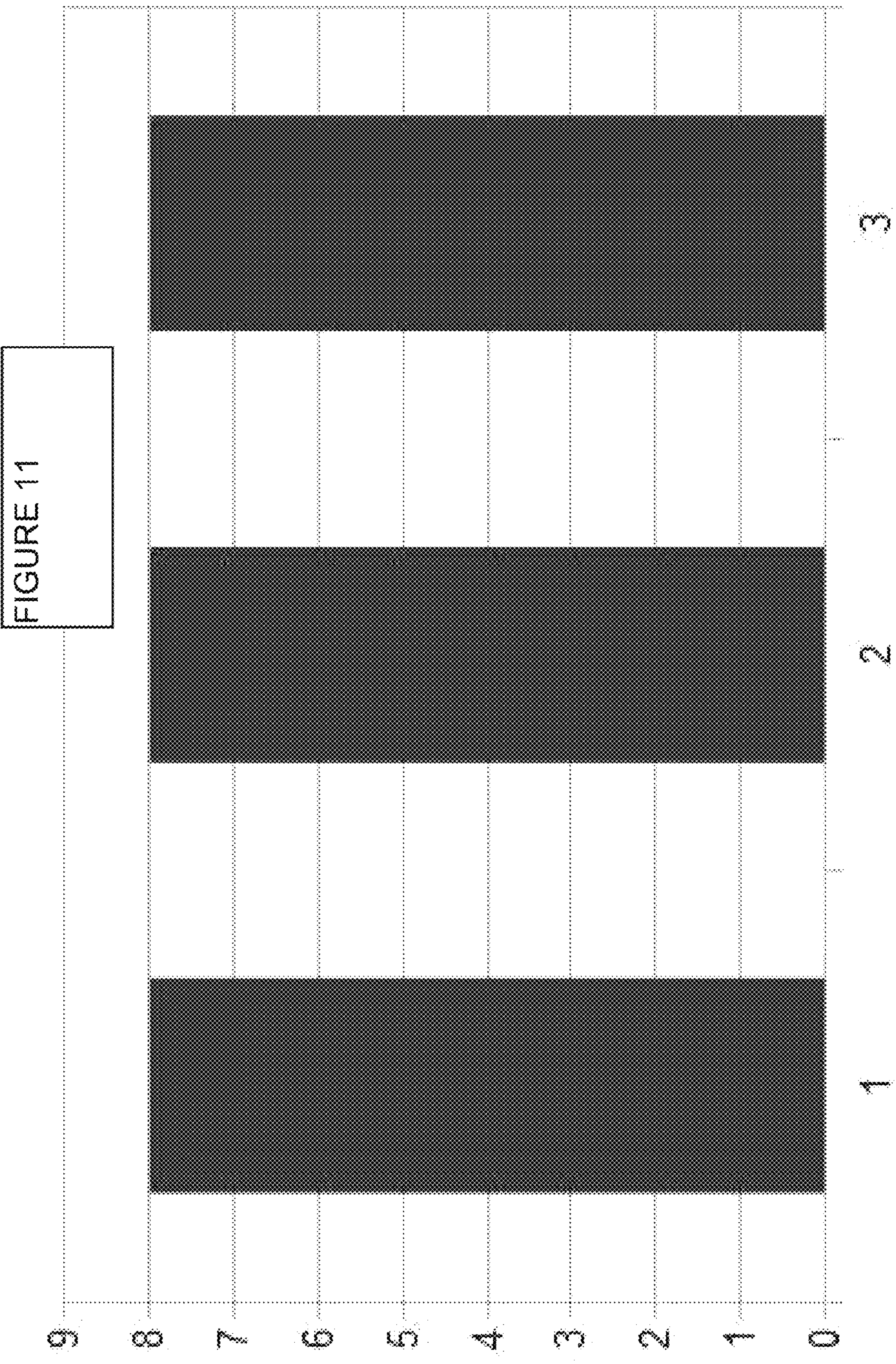
FIG. 11 shows a distribution where the same phone number has been observed eight times, according to one embodiment.

The assumption holds true in practice most of the time, but the system must handle cases when the assumption breaks down. A simple example is as follows: one has observed the same phone number eight times and that is all of the observations. Most likely, this number belongs to the sender, but without any other phone numbers to compare it to (no distribution), one can't compute the standard deviation, and thus neither the confidence. This is also true if one has seen several different numbers exactly the same number of times (e.g., WORK, CELL, HOME phone numbers in eight e-mails). Here again, the standard deviation is zero, and the confidence unexpectedly cannot be computed. For example, see FIG. 11, which shows a distribution where the same phone number has been observed eight times, according to one embodiment.

If the system does the following steps:

1) add a fake data point for each real data point; and
2) increase the number of real observed data points by one;

Then the system is guaranteed that:

1) the confidence is computable in all cases (e.g., the standard deviation is greater than zero); and
2) all confidences are comparable in the same range (e.g., rankable).

Figure 12:
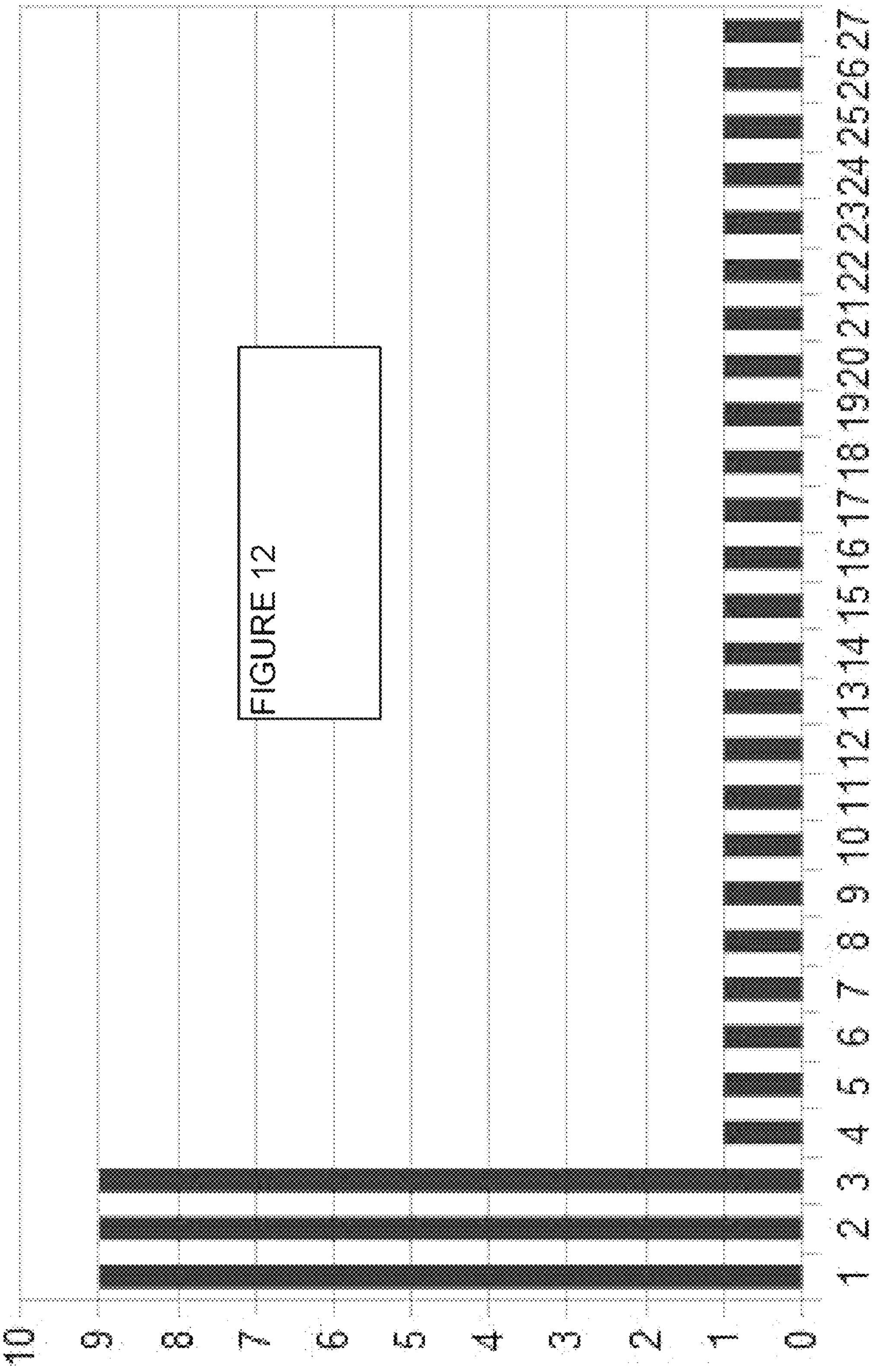
FIG. 12 shows a distribution to which so-called "fake" observations have been added to handle degenerate statistical cases, according to one embodiment.

Note that step 2) above is only done for real data points. This ensures that the number of observations for each phone number can never all be equal (e.g., there will always be more real observations of a phone number than of a fake phone number). This ensures that the standard deviation is always computable. Also, see, for example, FIG. 12, which shows a distribution to which "fake" observations have been added to handle degenerate statistical cases, according to one embodiment.

In addition, the real data point is scaled based on the decay function (e.g., older is less important), so the fake data point must also be scaled with the same decay function so as not to introduce a bias to the long tail. It should be noted that if the fake data points were not scaled the same way as the real data points, then the distribution would be biased towards fake data. For example, a real data phone number observed 26 weeks ago would be scaled by 0.5. A fake data point is then added to create the long tail, but this data point must also be scaled by 0.5. If it were not scaled (e.g., if it were just kept at the default 1.0), then this would be equivalent to adding two fake data points. Essentially, both real and fake data points are scaled the same way for the sake of consistency.

Extraction of Addresses or Other Strings from Communications

Figure 16:
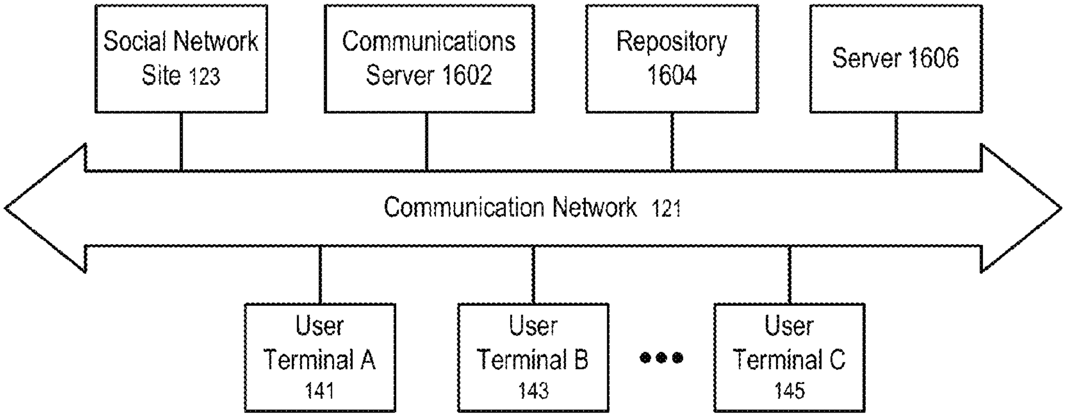
FIG. 16 shows a system to extract addresses or strings from one or more communications, according to one embodiment.

FIG. 16 shows a system to extract addresses or strings from one or more communications, according to one embodiment. In one example, the system of FIG. 16 may use one or more components from the system of FIG. 13, but with modifications to incorporate address extraction as described below. In one example, the system of FIG. 16 is used to extract an address from a communication, and the system is used to determine (as was discussed in detail above) whether this address corresponds to a person profile for a person (e.g., the person Rick discussed above with respect to FIG. 3). In exemplary embodiments, the extracted address is a physical address (e.g., a mailing address or a postal address).

More specifically, in the embodiment of FIG. 16, communications server 1602 (e.g., a communications server like that of FIG. 13) handles communications to and from a user of a user terminal (e.g., user terminal 145). These communications may be, for example, e-mails, text messages, tweets, or other communications containing text, words, numbers, etc. For example, a sender may send a message to a user of a service (e.g., a person profile service) provided by server 1602. This user receives the message on the user terminal 145.

As was discussed above, information may be extracted from this message and added to a person profile for the sender. In addition, other information may be obtained about the sender such as by performing a search or requesting information from third-party servers such as, for example, social network site 123. One of the forms of information that may be extracted from the message is an address of the sender. This address may be extracted as described below and then added to the person profile of the sender. Person profiles for various persons, including the sender, may be stored on, for example, communications server 1602 or another computing apparatus such as repository 1604.

In addition, in some embodiments, the extracted address may be submitted in a query or question sent from communications server 1602 to server 1606 (e.g., an Elcaro server like that of FIG. 13 or another type of server) in order to determine whether the extracted address corresponds to the sender. In this case, the extracted address would be one of the observations made in the message from the sender.

Figure 17:
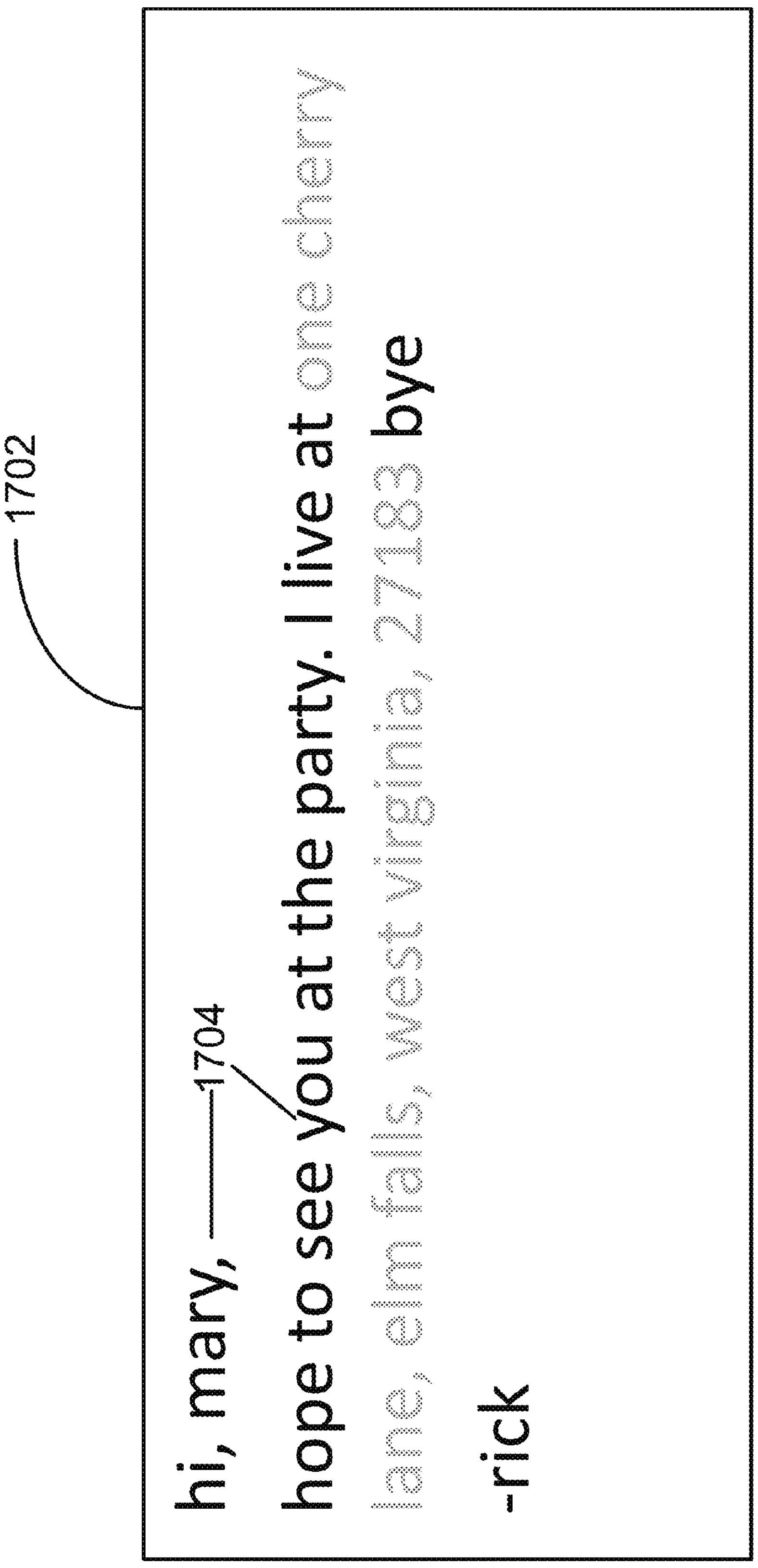
FIG. 17 shows an example of a communication received from a sender, according to one embodiment.

FIG. 17 shows an example of a communication 1702 received from a sender (e.g., Rick), according to one embodiment. Communication 1702 contains words 1704. Words 1704 include some words solely comprising letters such as the words “hope” or “party”. Other words solely comprise numerical digits such as the five-digit zip code “27183”.

The text of communication 1702 includes an address for the sender (i.e., “one cherry lane, elm falls, west virginia, 27183”). All or some of this address is desired to be identified and/or extracted. It should be noted that an address to be extracted should comprise text that is contiguous, such as is the case in FIG. 17. If the address text is not contiguous, then the address extraction approach described below may degrade rapidly or even fail.

Figure 18:
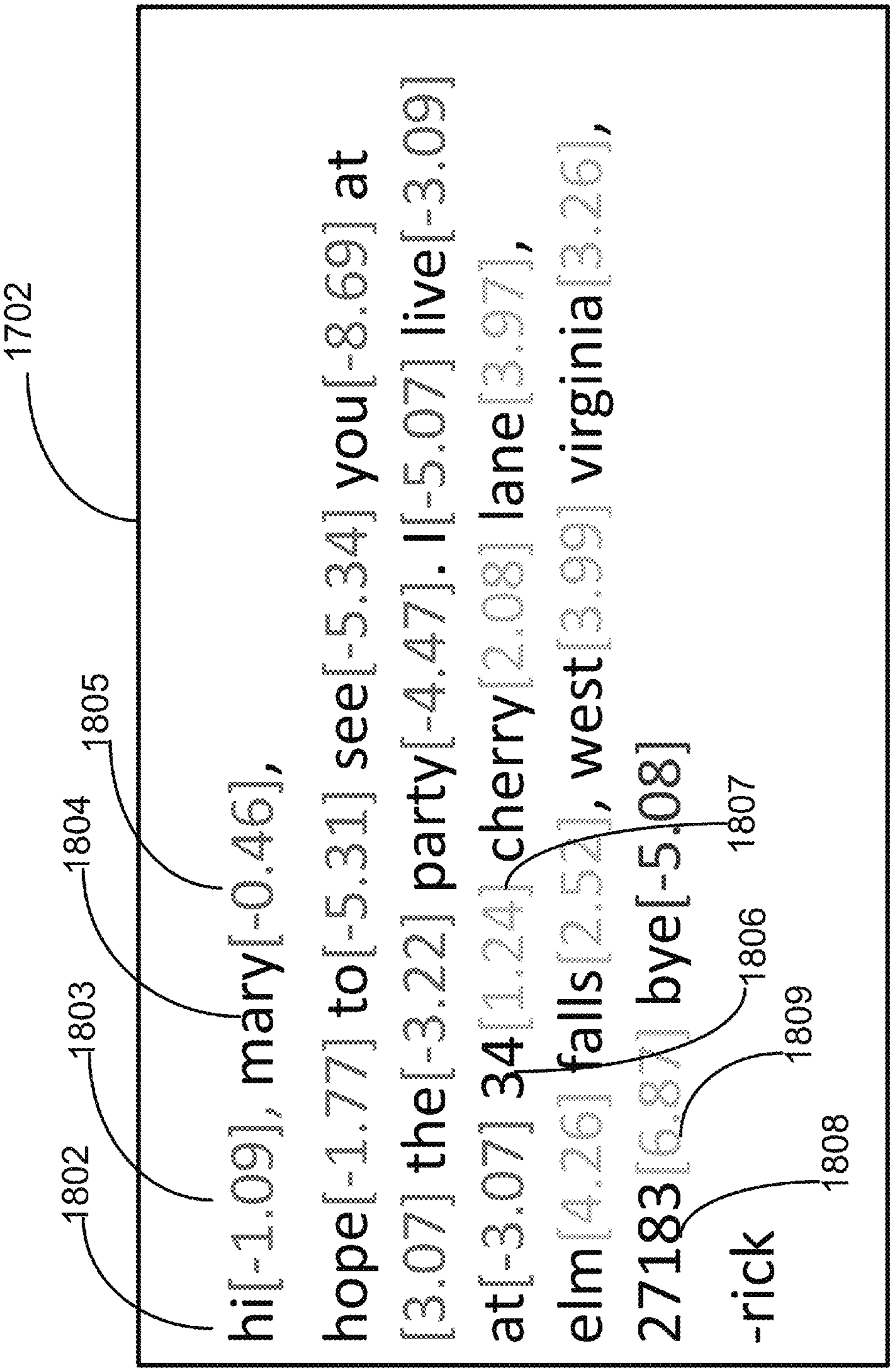
FIG. 18 shows the forming of tokens for words in the communication of FIG. 17, along with an associated score for each such token, according to one embodiment.

FIG. 18 shows the forming of tokens for words in communication 1702 of FIG. 17, along with an associated score for each such token, according to one embodiment. Words are tokenized for further processing as described below, including for assignment of the respective associated score. In general, the associated score indicates the likelihood, strength, probability, frequency, or tendency of the word (corresponding to the respective token) to be used by a sender as part of an address in a communication. The likelihood of a word being part of an address may be determined as described in more detail below in order to provide an associated score for each token. A positive score indicates an increased likelihood of usage as an address, and a negative score indicates a decreased likelihood of usage as an address. It should also be noted that although this embodiment illustrates the extraction of an address, in other embodiments other types of words, text, numbers, or other strings may be extracted.

More specifically, tokens 1802 and 1804 each have a respective associated score 1803 and 1805. Token 1806 has an associated score 1807, and token 1808 has an associated score 1809.

Further processing as described below uses these scores in order to identify the presence of an address in communication 1702. This processing generally involves selecting several word sequences from the text of communication 1702. For example, a word sequence of length five will include five tokens in a serial sequence pulled from communication 1702 (e.g., the tokens corresponding to the word sequence “hope to see you at”). The score for each of these five tokens will be added together to provide a total sum. A total sum having a higher positive value indicates a greater likelihood that a word sequence is part of or corresponds to an address. In one embodiment, a total sum is determined for every word sequence of length five in communication 1702. Then a total sum is determined for every word sequence of other lengths (e.g., word sequence lengths of 2, 3, . . . , 20). For example, a word sequence may be selected (from all of the word sequences of various lengths that are processed) that has the highest total sum and is thus identified as the address to be extracted from communication 1702. In one embodiment, this highest total sum must be equal to or greater than a predetermined threshold in order for a word sequence to be identified as an address. It should be noted that the total sum for each given word sequence may include additional scores for starting and ending words as discussed in detail below.

In one example, for all contiguous word sequences in communication 1702 of length 5-20 (or alternatively, 2-12), a total sum is computed for each such word sequence. The word sequence with the highest score, if it’s above a threshold, is identified as an address, and then extracted for inclusion in a person profile. In one example, the threshold is a value of 50. Also, each number sequence is tokenized to a token of a type corresponding to the number of digits in the number sequence, and an associated score is used for each such token. For example, in FIG. 18, the address is illustrated as having a token 1806 comprised of two numerical digits “34”. Also, token 1808 is a zip code/word having five numerical digits.

As one specific example of contiguous word sequences in a body of text, consider the simple text “hello daisy, street party.” This text contains six contiguous word sequences as follows: “hello daisy”, “daisy street”, “street party”, “hello daisy street”, “daisy street party”, and “hello daisy street party”. One of these sequences may be extracted from the text (as being the best choice) based on a total sum calculated for each of the six sequences. The sequence with the highest total sum is the best sequence and is selected for extraction. In other words, the best sequence is a contiguous sequence of words extracted from the text based on the total sum of the words that comprise it (note that this total sum may include additional scores for the first and last words of the sequence as described in detail below). The example just provided illustrates the use of this approach more generally for extracting a sequence from a larger set of data as typically found in actual communications.

Now discussing further various embodiments related to address (or other string) extraction, in one embodiment, a method includes: receiving a communication from a sender comprising a plurality of words; assigning, via a computing apparatus (e.g., communications server 1602, repository 1604, or server 1606), a score to each of the words; determining, via the computing apparatus, a respective total sum for each of a plurality of word sequences in the communication, the respective total sum determined as a sum of the scores for each word (e.g., the score for the corresponding token as discussed above) in the respective word sequence; identifying a first word sequence of the word sequences having a total sum that is greater than a threshold value; and extracting the first word sequence from the communication as an address of the sender. In one embodiment, each of the words solely comprises letters or numerical digits. In one example, at least one of the words is a zip code comprising five numerical digits.

In one embodiment, the score assigned to each of the words corresponds to a frequency of usage of the respective word as an address in a language (e.g., in the English language) relative to a frequency of usage of the respective word generally in the language (e.g., as determined from data regarding general usage of words in the English or another language by frequency of usage for each word). In one embodiment, the score for a word/token is calculated based on a ratio of the frequency of usage of the word as an address (i.e., frequency of usage of the word in addresses as compared to a total number of words used in addresses) to the frequency of general usage of the word (i.e., frequency of general usage of the word as compared to a total number of all words) (e.g., as determined by analysis of past data and/or language statistics). In one embodiment, the final score for a word is determined by taking the logarithm of the ratio value (e.g., a natural logarithm). The log scores are added together for a word sequence.

For example, a large collection of prior communications such as stored in a data repository 1604 may serve as a data training set for calculating the above frequencies of usage. For example, the number of times that each word is used in any of the communications in repository 1604 as an address may be compared to the total number of times that the word is used for any reason in order to calculate a frequency of usage as an address. Alternatively, other databases or information sources may be used to determine this frequency. Also, the frequency of usage of the word generally in any given language may be based on publicly-available statistics and/or may be determined by counting usage of words in any repository or database that contains words or other strings. The data training sets used for determining frequencies of word usage typically will vary and be specific to the particular function of usage to be identified and extracted from a communication. As examples, in addition to being language specific the scores are also context specific. If one is to extract addresses from e-mails, then the scores are generated from e-mail training data. If one is to extract scores from Facebook messages then one generates different scores from Facebook training data, etc.

The assigning of the score may include forming a plurality of tokens from the communication, each token corresponding to one of the words, and the assigning of a score to each of the tokens. In one example, a first word of the words solely comprises numerical digits, and the forming the tokens comprises forming a single token corresponding to the first word. For example, a five digit zip code may be treated as a token of the type "5-Digit Numerical Sequence" regardless of the specific numbers present in any given zip code. The token type 5-Digit Numerical Sequence may have an associated score that is the same for any given 5-digit number that is present in communication 1702.

In one embodiment, each of the word sequences has a length of, for example, between 2 and 20 words (this number range will vary as a system is tuned, and also vary from one implementation to another). In one embodiment, the method further includes storing the address, as part of a person profile of the sender, in a data repository (e.g., repository 1604) including a plurality of person profiles for other senders. In one example, the person profile is a profile for the sender of the communication.

In one embodiment, the determining of a total sum for a word sequence under consideration (i.e., being examined or assessed) includes: determining an additional score for a starting word of the word sequence (this additional score is added to the total sum described above for each word sequence). The additional score for the starting word is associated with a probability that the starting word has been used as the first word in an address in communication 1702.

An additional score is determined for an ending word of a word sequence. The additional score for the ending word is associated with a probability that the ending word is the last word of an address. In one embodiment, the probabilities associated with starting and ending words may be determined based on historical data, and these probabilities do not need to be determined in the same way as was described herein for word scores (other types of data may be used to determine these probabilities). A logarithm of each of the probabilities is taken to provide the additional score. The additional score (i.e., logarithm of probability) for the starting word and the additional score for the ending word are added to the total sum prior to deciding whether a word sequence is used as an address or not (the selection of the "best" sequence, which is most likely the correct address in a communication). In one example, the additional score for the ending word is the natural logarithm of the percentage of time, or frequency, with which the ending word appeared as the last word in the training set used).

As an example, a word that is a two-digit number is calculated to have an additional score based on the probability that any two-digit number is a starting word of a word sequence that corresponds to an address. The score related to this probability is added to the total sum of word scores that was calculated as described above for a word sequence.

In another example, an address being tested (i.e., a specific word sequence in a communication) begins with the word "street". Although this word has a high likelihood of being used in an address, most addresses do not start with this word. Instead, addresses usually start with a number (e.g., "34" or "6845"). Using an additional score for a starting word will help to prevent false address identification.

FIG. 19 illustrates Bayes' theorem and its application to determining a probability that a word is part of an address given that a particular word is present in a communication, according to one embodiment. In this example, the frequency of usage of the word "meadow" as an address in a data corpus of prior-collected addresses, and the frequency of the word "meadow" in the English language are used to calculate a score that is proportional to the probability that the word "meadow" is part of an address when used in the text of communication 1702. It should be noted that the generality of the methods above is not limited by any specifics of Bayes' theorem.

FIG. 20 illustrates examples of words being more or less likely used in an address of a communication, according to one embodiment. For example, the score for a word is greater than one if the word is more likely to have an address usage, and is less than one if the word is less likely to have an address usage.

FIG. 21 illustrates examples of top-rated address words and top-rated English words, according to one embodiment. For example, the word "tx" has a very high positive score because this word is rarely or never found in English language usage other than as part of an address.

FIG. 22 illustrates a Bayesian classifier that multiplies word probabilities together to determine an overall probability, according to one embodiment. Here, a probability that a word sequence is used as an address is determined by multiplication of individual word scores.

FIG. 23 illustrates the transformation of a score for a word sequence as illustrated in FIG. 22 into a logarithmic score, according to one embodiment. In order to calculate the associated scores, such as was illustrated in FIG. 18 above, a logarithm of each word score is taken, and then the logarithmic scores are added together in order to calculate a total sum for the word sequence (e.g., as was illustrated with respect to FIG. 18 above).

Various additional non-limiting embodiments and examples related to address (or other string) extraction are discussed below. In a first embodiment, it is desired to identify which part of text found in a communication is a physical address of the sender. The communication may be, for example, an e-mail, a Facebook message, a text message, or other messages.

In another embodiment, the frequency of a word as it appears in an address corpus or data set is compared to the frequency of the word as it appears in the English language. The address corpus may be a collection of thousands of prior addresses extracted from prior communications of a plurality of persons. In this embodiment, a score is associated with every word in the English language. If the score (a log score as discussed above) is greater than zero, then the word is probably part of an address. The address corpus may contain, for example, between 2-15 million postal mailing addresses.

In one embodiment, the frequency of the word in an address corpus is divided by the frequency of the word in the English language or alternatively in some other data corpus. The logarithm of this ratio provides the score for that word and for the token corresponding to that word after the tokenization discussed above. As one example, the word "meadow" may occur 1 out of 8,500 times in an address corpus such as a phone book or other address listing/compilation. In particular, the names of people and other information would be removed from the data in the phone book so that the only remaining data in the address corpus would be words forming a portion of an address (e.g., streets, towns, zip codes, street names, etc.). In contrast, the word "meadow" may appear one out of 430,000 times in a large database of words in a language such as all words in a Library of Congress collection.

In one embodiment, an address or other language corpus contains a portion of words that are coined words that are not in conventional usage in the English language. Words such as this are simply ignored in the above process. Also, different training data sets would be used for the extraction process when using it in another language.

In one embodiment, the extraction process begins with the cleaning process that extracts the pure tokens in a communication, which are typically words. If the application has any other characters that are not a number or letter, the tokenization process simply ignores those characters. For example, such characters would include commas, periods, dashes, exclamation points, etc.

In one embodiment, the database is queried for a score for each of the tokens. If the score exist in the database, then the score is assigned to the token. If a score does not exist in the database, then the token gets a score of zero. Thus, communication is tokenized with every token being scored. Then, total sums are calculated for word sequences as discussed above.

In one embodiment, numerical digit sequences are classified into token types (one type for each digit length of numerical sequence). This is so that it is not necessary to treat every single unique number as a unique token. For example, a digit sequence of length five, no matter what the digits are, is associated with a token defined to represent any five-digit sequence. Thus, the word score database does not need to be filled with every unique numerical zip code. Instead, scores and frequencies for numerical digit sequences can be calculated using an address corpus by treating any digit sequence of a given digit length as being the same word.

In one embodiment, various filters may be applied to the extraction process. One of these filters is the threshold for the total sum of the word sequence as discussed above. Another filter would require that a ratio of number tokens to character tokens be greater than or less than a predetermined value. For example, addresses generally don't have more than 40% numerical tokens. Another filter places a limit on the number or proportion of unknown tokens. Yet another filter applies a rule in which if there is any token in a word sequence that scores poorly (i.e., below pre-determined number threshold), then the entire word sequence is disqualified from being identified as an address.

Finally, in one embodiment, an alphabetic filter may be applied in which all numerical tokens (e.g., 2, 3, 4, 5, . . . digit numbers, etc.) in a word sequence are tossed out and a score is applied to the remaining alphabetic tokens. If the alphabetic score is zero, then the word sequence is disqualified. Alternatively, if the alphabetic score is less than a predetermined threshold, then the word sequence is disqualified.

Figure 14:
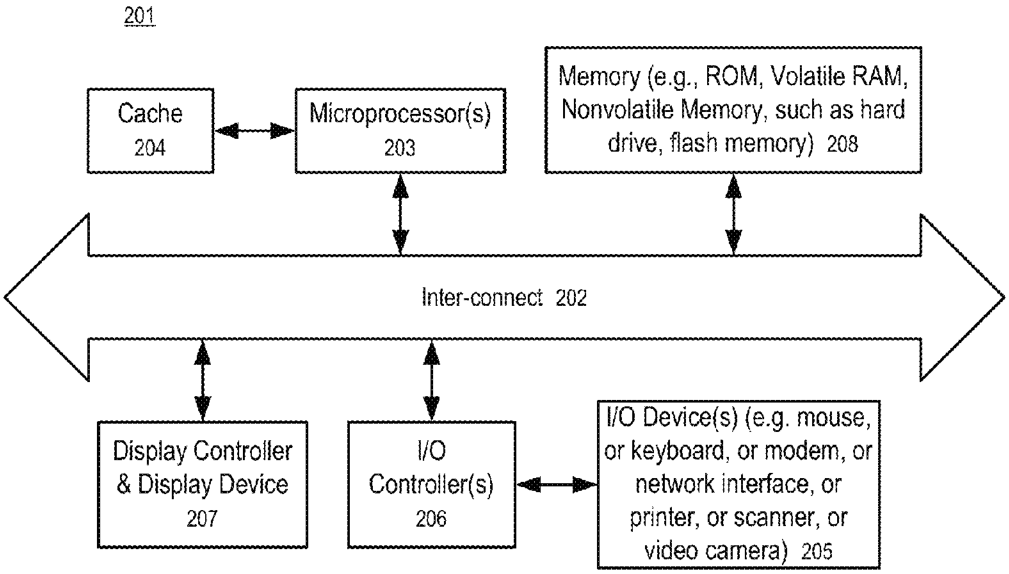
FIG. 14 shows a block diagram of a data processing system which can be used in various embodiments.

FIG. 14 shows a block diagram of a data processing system which can be used in various embodiments (e.g., for implementing one or more components illustrated in FIG. 13 or FIG. 16). While FIG. 14 illustrates various components of a computer system, it is not intended to represent any particular architecture or manner of interconnecting the components. Other systems that have fewer or more components may also be used.

In FIG. 14, the system 201 includes an inter-connect 202 (e.g., bus and system core logic), which interconnects a microprocessor(s) 203 and memory 208. The microprocessor 203 is coupled to cache memory 204 in the example of FIG. 14.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 14 is used to implement the communications server and/or an online social network site of FIG. 13, and/or other servers, such as a server to implement the repository and/or Elcaro server(s) of FIG. 13.

In one embodiment, a data processing system as illustrated in FIG. 14 is used to implement a user terminal, which may receive or send messages to or from users or recipients each having a person profile stored on or managed by communications server. A user terminal may be in the form of a personal digital assistant (PDA), a cellular phone, a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 15:
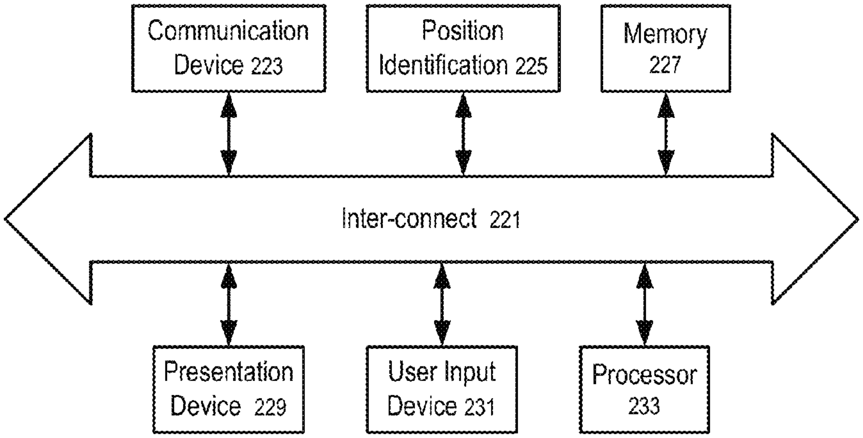
FIG. 15 shows a block diagram of a user device according to one embodiment.

FIG. 15 shows a block diagram of a user device according to one embodiment. In FIG. 15, the user device includes an inter-connect 221 connecting the presentation device 229, user input device 231, a processor 233, a memory 227, a position identification unit 225 and a communication device 223.

In FIG. 15, the position identification unit 225 is used to identify a geographic location for a user. The position identification unit 225 may include a satellite positioning system receiver, such as a Global Positioning System (GPS) receiver, to automatically identify the current position of the user device. In FIG. 15, the communication device 223 is configured to communicate with the communications server, or an online social network.

In one embodiment, the user input device 231 is configured to generate user data content. The user input device 231 may include a text input device, a still image camera, a video camera, and/or a sound recorder, etc. In one embodiment, the user input device 231 and the position identification unit 225 are configured to automatically tag user data content created by the user input device 231 with the navigation information identified by the position identification unit 225.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:

receiving a communication from a sender comprising a plurality of words, wherein at least one of the words is a zip code comprising five numerical digits;

assigning, via a computing apparatus, a score to each of the words, wherein the score assigned to each of the words is based on a ratio of a first frequency of usage of the respective word in a language relative to a second frequency of usage of the respective word in the language, and wherein a first set of words comprises a first total number of words used as an address, a second set of words comprises a second total number of words including words used other than as an address, the first frequency is determined by counting occurrence of the respective word in the first set of words relative to the first total, the second frequency is determined by counting occurrence of the respective word in the second set relative to the second total, and the first total is less than the second total, and wherein the assigning the score further comprises determining a score for a numerical digit sequence based on treating any numerical digit sequence of a given digit length as being the same word;

determining, via the computing apparatus, a respective total sum for each of a plurality of word sequences in the communication, the respective total sum determined as a sum of the scores for each word in the respective word sequence;

identifying a first word sequence of the word sequences having a total sum that is greater than a threshold value;

applying a at least one filter to the first word sequence, the at least one filter comprising determining a ratio of number tokens to character tokens in the first word sequence, and comparing the ratio to a predetermined value to determine whether the first word sequence passes the at least one filter, and the at least one filter further comprising determining whether the first word sequence includes a token that scores below a predetermined threshold, wherein determining that the first word sequence includes a token that scores below the predetermined threshold disqualifies the first word sequence from being identified as an address;

in response to determining that the first word sequence passes the at least one filter, extracting the first word sequence from the plurality of words of the received communication as a first address of the sender, wherein the first word sequence contains the zip code; and storing, in a data repository, the first address in a first person profile of the sender, wherein the data repository stores a plurality of person profiles including the first person profile.

2. The method of claim 1, wherein the assigning the score further comprises forming a plurality of tokens from the communication, each token corresponding to one of the words, and assigning a score to each of the tokens.

3. The method of claim 2, wherein a first word of the words solely comprises numerical digits, and the forming the tokens comprises forming a single token corresponding to the first word.

4. The method of claim 1, wherein each of the word sequences has a length of between 2 and 20 words.

5. The method of claim 1, wherein the determining the total sum for the first word sequence comprises:

determining an additional score for a starting word of the first word sequence, wherein the additional score for the starting word is associated with a probability that the starting word is part of an address;

determining an additional score for an ending word of the first word sequence, wherein the additional score for the ending word is associated with a probability that the ending word is part of an address; and adding the additional score for the starting word and the additional score for the ending word to the sum of scores for the first word sequence to obtain the total sum.

6. A system, comprising:

at least one processor;

memory storing instructions, that when executed by the processor, cause the system to: receive a communication from a sender comprising a plurality of words, wherein at least one of the words is a zip code comprising five numerical digits;

assign a score to each of the words, wherein the score assigned to each of the words is based on a ratio of a first frequency of usage of the respective word in a language relative to a second frequency of usage of the respective word in the language, and wherein a first set of words comprises a first total number of words used as an address, a second set of words comprises a second total number of words including words used other than as an address, the first frequency is determined by counting occurrence of the respective word in the first set of words relative to the first total, the second frequency is determined by counting occurrence of the respective word in the second set relative to the second total, and the first total is less than the second total, and wherein the assigning the score further comprises determining a score for a numerical digit sequence based on treating any numerical digit sequence of a given digit length as being the same word;

determine a respective total sum for each of a plurality of contiguous word sequences in the communication, the respective total sum determined as a sum of the scores for each word in the respective contiguous word sequence;

identify a first word sequence of the word sequences having a total sum that is greater than a threshold value;

apply at least one filter to the first word sequence, the at least one filter comprising determining a ratio of number tokens to character tokens in the first word sequence, and comparing the ratio to a predetermined value to determine whether the first word sequence passes the at least one filter, and the at least one filter further comprising determining whether the first word sequence includes a token that scores below a predetermined threshold, wherein determining that the first word sequence includes a token that scores below the predetermined threshold disqualifies the first word sequence from being identified as an address;

in response to determining that the first word sequence passes the at least one filter, extract the first word sequence from the plurality of words of the received communication as a first address of the sender, wherein the first word sequence contains the zip code; and store, in a data repository, the first address in a first person profile of the sender, wherein the data repository stores a plurality of person profiles including the first person profile.

7. The system of claim 6, wherein the determining the total sum for the first word sequence comprises:

determining an additional score for a starting word of the first word sequence, wherein the additional score for the starting word is associated with a probability that the starting word is part of an address;

determining an additional score for an ending word of the first word sequence, wherein the additional score for the ending word is associated with a probability that the ending word is part of an address; and adding the additional score for the starting word and the additional score for the ending word to the sum of scores for the first word sequence to obtain the total sum.

8. The system of claim 6, wherein the assigning the score further comprises forming a plurality of tokens from the communication, each token corresponding to one of the words, and assigning a score to each of the tokens.

9. The system of claim 8, wherein a first word of the words solely comprises numerical digits, and the forming the tokens comprises forming a single token corresponding to the first word.

10. A non-transitory computer-readable storage medium storing computer-readable instructions, which when executed, cause a system to:

receive a communication from a sender comprising a plurality of words, wherein at least one of the words is a zip code comprising five numerical digits;

assign, via at least one processor, a score to each of the words, wherein the score assigned to each of the words is based on a ratio of a first frequency of usage of the respective word in a language relative to a second frequency of usage of the respective word in the language, and wherein a first set of words comprises a first total number of words used as an address, a second set of words comprises a second total number of words including words used other than as an address, the first frequency is determined by counting occurrence of the respective word in the first set of words relative to the first total, the second frequency is determined by counting occurrence of the respective word in the second set relative to the second total, and the first total is less than the second total, and wherein the assigning the score further comprises determining a score for a numerical digit sequence based on treating any numerical digit sequence of a given digit length as being the same word;

determine a respective total sum for each of a plurality of word sequences in the communication, the respective total sum determined as a sum of the scores for each word in the respective word sequence;

identify a first word sequence of the word sequences having a total sum that is greater than a threshold value;

apply at least one filter to the first word sequence, the at least one filter comprising determining a ratio of number tokens to character tokens in the first word sequence, and comparing the ratio to a predetermined value to determine whether the first word sequence passes the at least one filter, and the at least one filter further comprising determining whether the first word sequence includes a token that scores below a predetermined threshold, wherein determining that the first word sequence includes a token that scores below the predetermined threshold disqualifies the first word sequence from being identified as an address;

in response to determining that the first word sequence passes the at least one filter, extract the first word sequence from the plurality of words of the received communication as a first address of the sender, wherein the first word sequence contains the zip code; and store, in a data repository, the first address in a first person profile of the sender, wherein the data repository stores a plurality of person profiles including the first person profile.

11. The non-transitory computer-readable storage medium of claim 10, wherein the determining the total sum for the first word sequence comprises:

determining an additional score for a starting word of the first word sequence, wherein the additional score for the starting word is associated with a probability that the starting word is part of an address;

determining an additional score for an ending word of the first word sequence, wherein the additional score for the ending word is associated with a probability that the ending word is part of an address; and adding the additional score for the starting word and the additional score for the ending word to the sum of scores for the first word sequence to obtain the total sum.

12. The non-transitory computer-readable storage medium of claim 10, wherein the assigning the score further comprises forming a plurality of tokens from the communication, each token corresponding to one of the words, and assigning a score to each of the tokens.

13. The method of claim 1, wherein the determining the total sum for the first word sequence comprises:

determining an additional score for a starting word of the first word sequence;

determining an additional score for an ending word of the first word sequence; and adding the additional score for the starting word and the additional score for the ending word to the sum of scores for the first word sequence to obtain the total sum.

* * * * *